United States Patent
Biggs

(10) Patent No.: US 12,155,877 B2
(45) Date of Patent: Nov. 26, 2024

(54) NETWORK OPTIMIZATION THROUGH PREDICTED LOCAL CONTENT DISTRIBUTION SYSTEM

(71) Applicant: Charter Communications Operating, LLC, St. Louis, MO (US)

(72) Inventor: Ian David Biggs, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/949,780

(22) Filed: Sep. 21, 2022

(65) Prior Publication Data

US 2024/0098323 A1  Mar. 21, 2024

(51) Int. Cl.
H04N 21/25 (2011.01)
H04N 21/258 (2011.01)

(52) U.S. Cl.
CPC ..... H04N 21/251 (2013.01); H04N 21/25891 (2013.01)

(58) Field of Classification Search
CPC .................. H04N 21/251; H04N 21/25891
See application file for complete search history.

(56) References Cited

U.S. PATENT DOCUMENTS

| | | | |
|---|---|---|---|
| 8,312,504 B2 | 11/2012 | Carlucci | |
| 8,611,285 B2 | 12/2013 | Henning | |
| 9,282,352 B2 | 3/2016 | McDyson | |
| 9,338,489 B2 | 5/2016 | Gomez Uribe | |
| 9,681,164 B2 | 6/2017 | Chen | |
| 10,475,050 B2 | 11/2019 | Gomez Uribe | |
| 11,095,748 B1* | 8/2021 | Pallemulle | H04L 67/303 |
| 2012/0123992 A1 | 5/2012 | Randall | |
| 2012/0131623 A1 | 5/2012 | McDyson | |
| 2014/0088952 A1 | 3/2014 | Fife | |
| 2015/0181289 A1 | 6/2015 | Wheatley | |
| 2015/0208120 A1 | 7/2015 | Yao | |
| 2015/0256862 A1* | 9/2015 | Fragale | H04N 21/4334 725/98 |
| 2016/0191664 A1 | 6/2016 | Balakrishnan | |
| 2016/0360282 A1 | 12/2016 | Graham | |
| 2017/0195450 A1 | 7/2017 | Su | |
| 2018/0192137 A1 | 7/2018 | Patel | |
| 2019/0289350 A1* | 9/2019 | Gates | H04M 15/57 |
| 2019/0364340 A1 | 11/2019 | de Souza | |
| 2022/0094998 A1* | 3/2022 | Sivakumar | H04N 21/44222 |
| 2022/0174345 A1* | 6/2022 | Garcia | H04N 21/47214 |

* cited by examiner

Primary Examiner — Nnenna N Ekpo
(74) Attorney, Agent, or Firm — Brandon N. Sklar

(57) ABSTRACT

In accordance with an embodiment of the invention, a method of operating a local storage device ("LSD") in a broadband communication network is disclosed. The LSD is within a local area network of at least one user device. At least one item of digital content is received by the LSD from at least some of a plurality of digital content providers, via the network, during an off peak time period of the network. The item of digital content is selected by a respective content provider for download to a respective user based on the respective user. The received digital content is stored in the local storage device. A selected one of the stored digital content is provided from the LSD to a user device in response to a request from the user device. A system for providing digital content and an LSD, are also disclosed.

32 Claims, 19 Drawing Sheets

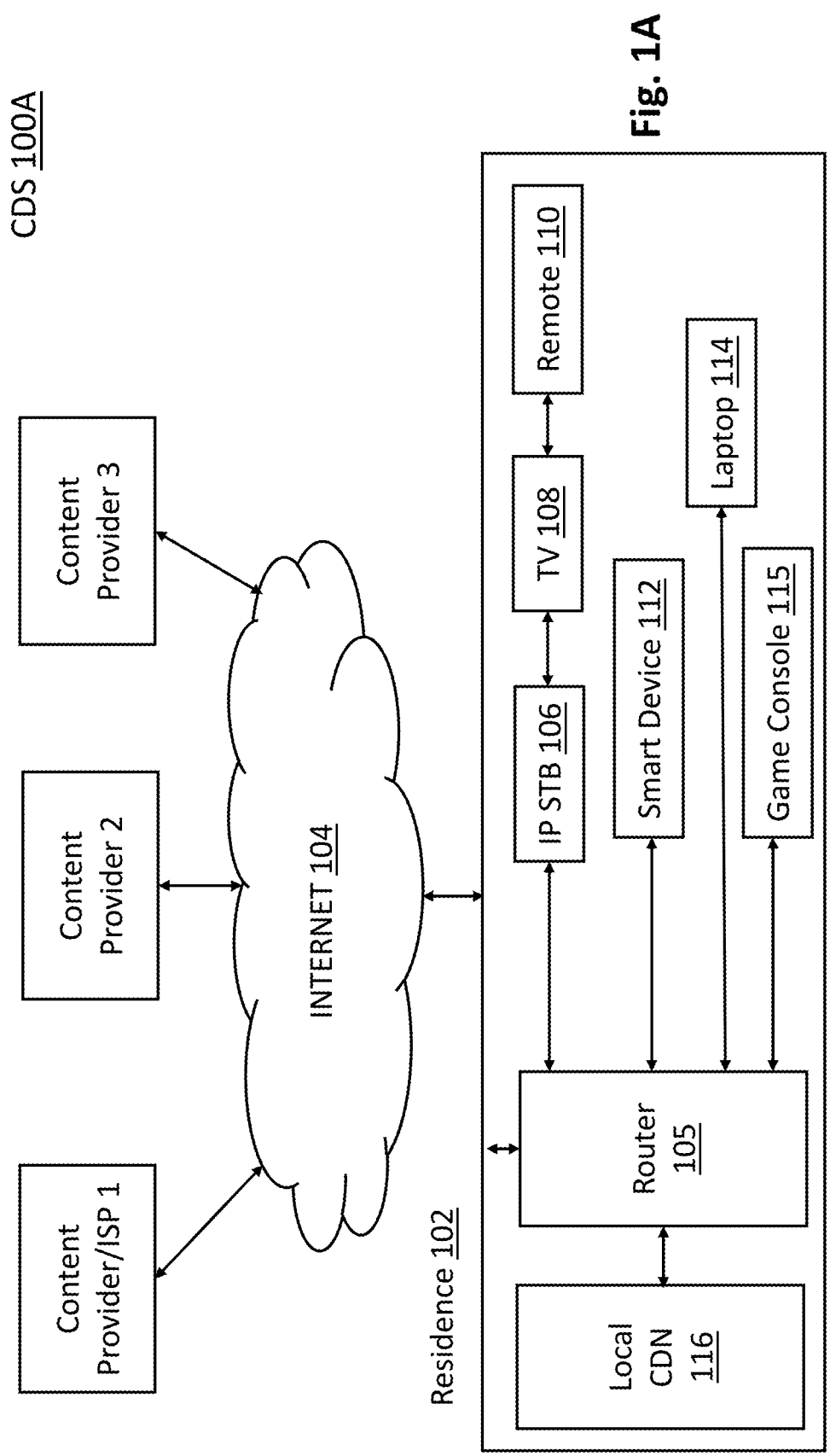

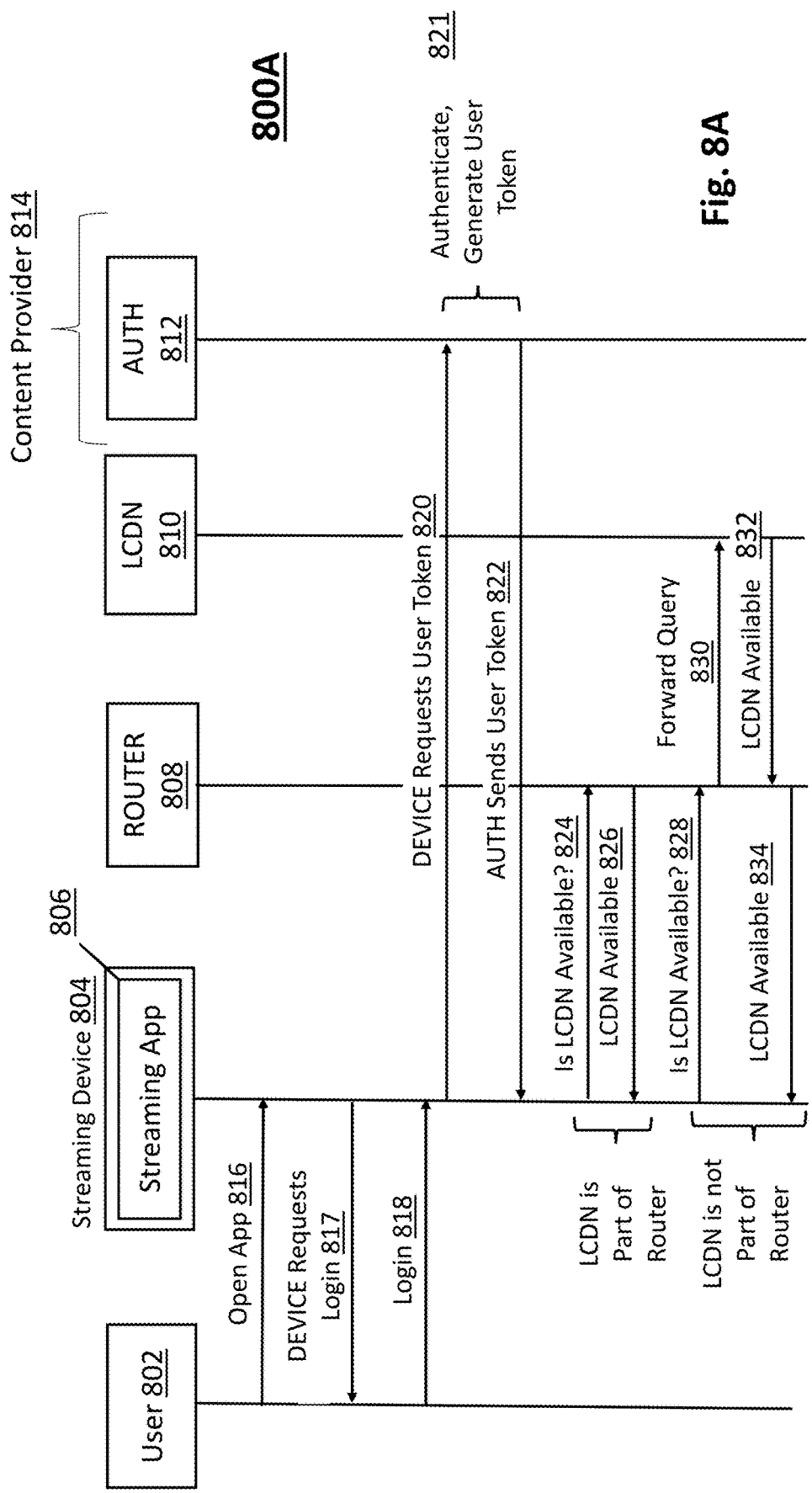

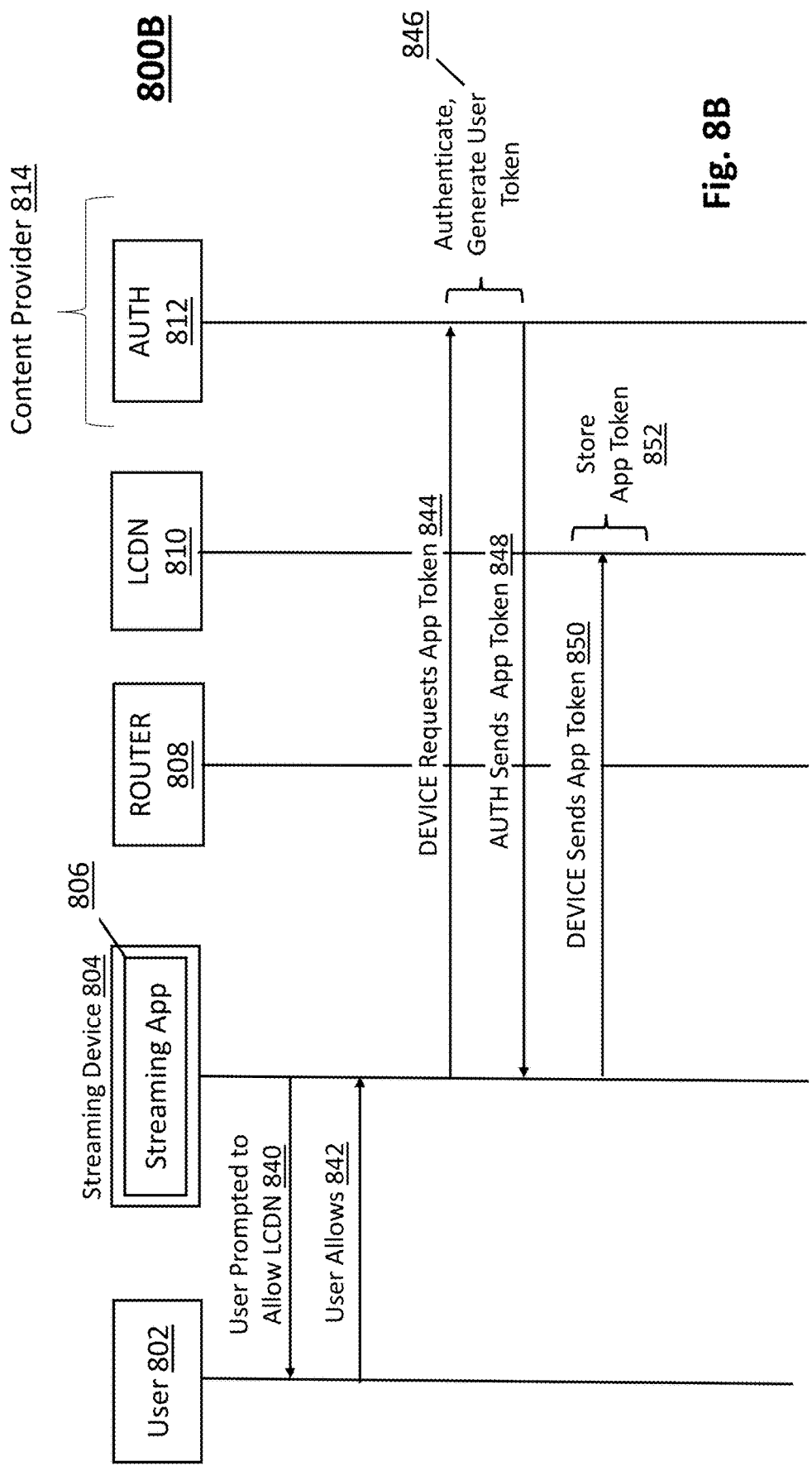

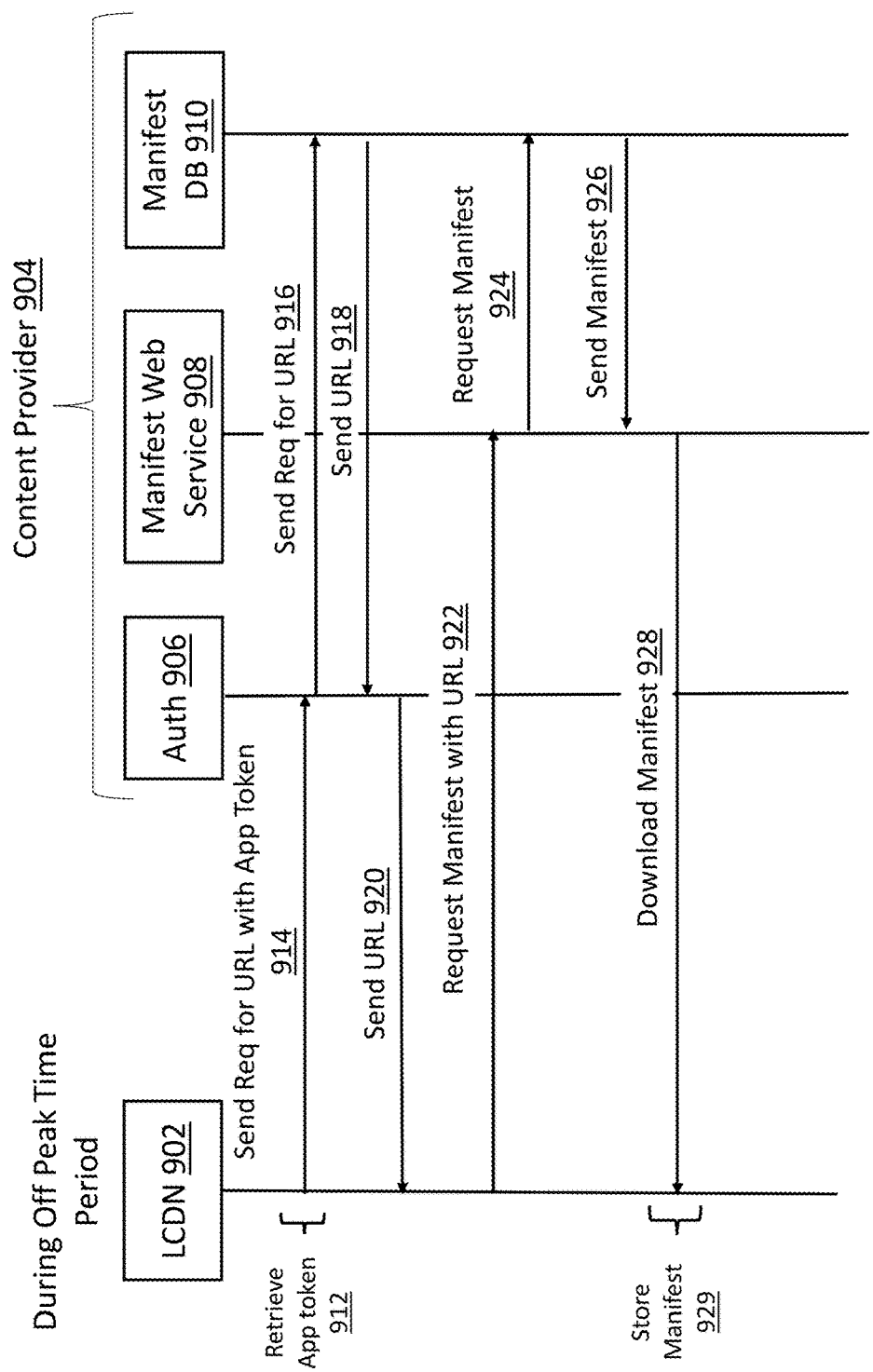

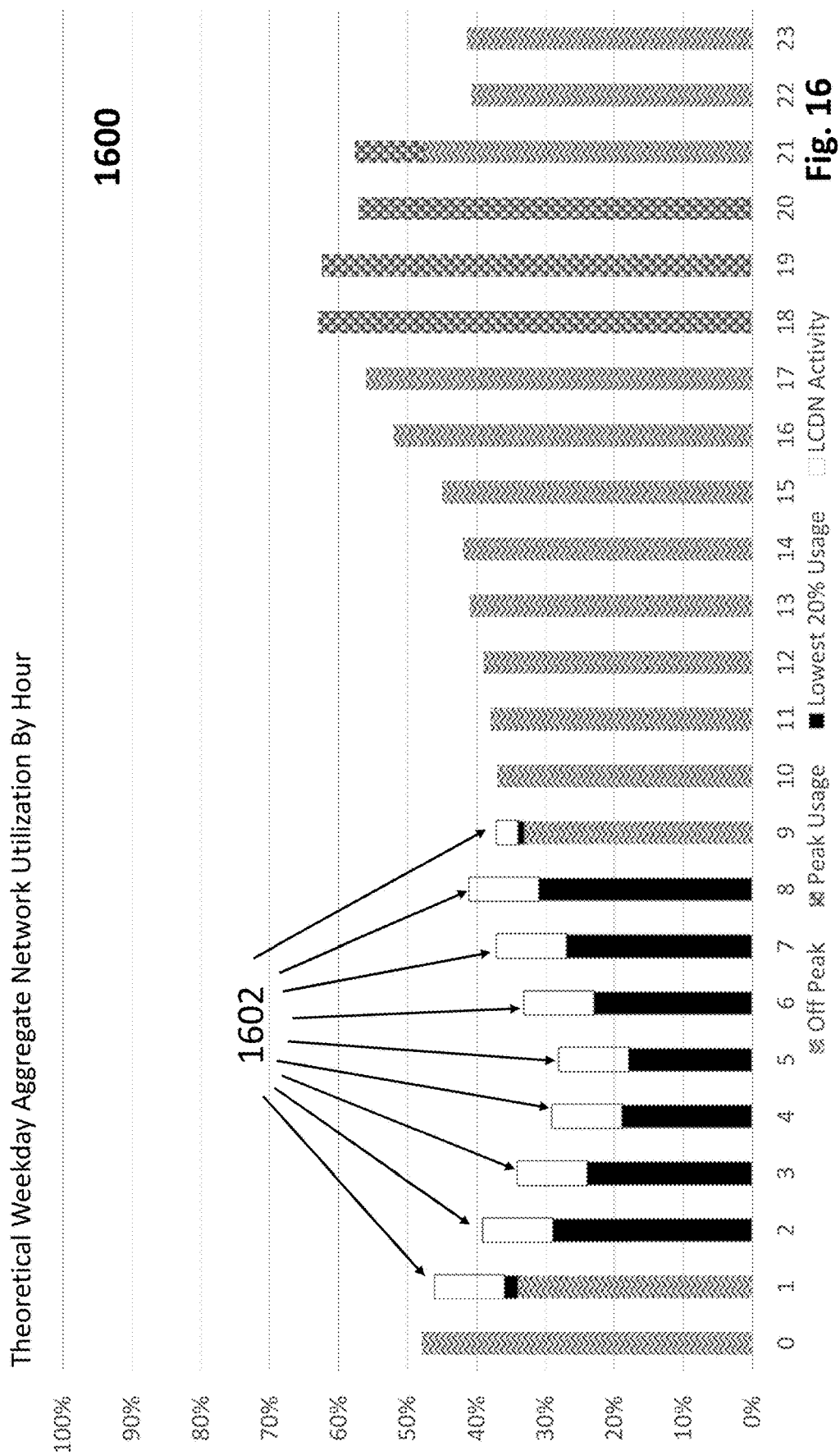

NETWORK OPTIMIZATION THROUGH PREDICTED LOCAL CONTENT DISTRIBUTION SYSTEM

FIELD OF THE INVENTION

The present application relates to communications networks and, more particularly, to methods and systems for optimizing communications networks.

BACKGROUND OF THE INVENTION

Streaming is a rapidly growing method of obtaining and viewing live and on demand programs via the Internet for entertainment and other purposes, such as distributing educational materials, or for the transmission of public governmental proceedings, for example. Some streaming content providers, referred to as multi-service operators, also provide a broad range of telecommunication services, including Internet access (as Internet service providers ("ISPs")), wireless, and telephone services, for example. Charter Communications, Stamford, Connecticut, is an example of a multi-service operator, which provides live streaming programming, on demand streaming programming, and ISP services, among other services. Dedicated, on demand streaming content providers, known as Over-the-Top or OTT providers, are primarily focused on creating and providing streaming program content to their subscribers. Examples of OTT providers include Netflix, Inco, Scotts Valley, California ("Netflix"), Amazon Prime, available from Amazon.com, Inc., Seattle, Washington ("Amazon Prime"), and/or Hulu, Santa Monica, California ("Hunt"), and Disney Plus from The Wait Disney Company, Los Angeles, California ("Disney Plus"), for example. Known streaming content providers require multi-service operators or other ISPs to convey their programs to users via the Internet.

It has been found that most program streaming takes place in the evening. ISPs and multi-service operators must be able to accommodate the large amount of streaming during the evening, or risk dissatisfying subscribers. Likewise, content providers also must meet peak demand. Network bandwidth constraints provide economic and performance limitations on content providers and users of network services. High volumes of streaming programs can cause transmission delays of streaming content and other Internet services, low resolution, and stuttering, for example. As multi-service operators, ISPs, and streaming content providers attempt to meet the increasing demand for streaming content, as well as higher resolution streaming content, they must expand their Internet network capacity by expanding their network infrastructure. This causes increased costs to the multi-service operators, ISPs, and streaming content providers, as well as their users and subscribers.

SUMMARY OF THE INVENTION

It would be advantageous to content providers, including multi-service operators, ISPs, and users, to decrease the volume of downloading traffic, including streaming traffic during periods of high demand, referred to herein as a peak time period. In accordance with embodiments of the invention, some digital content is downloaded to a local storage device accessible by users and user devices prior to their being requested by a user. The program may be provided during a time period when there is lower network utilization, to decrease the volume of traffic downloaded during a time period of higher network utilization. In one example, the programs provided are selected by a content provider prior to their selection by a user based on user activity, such as programs previously selected for streaming by the respective user. Decreasing network utilization during a peak time period of high network utilization by downloading digital content during a time period of lower network utilization, before a user selects the content for download, would improve network performance, improve the quality of streamed programs, improve customer satisfaction, and decrease the costs of multi-service operators and ISPs, as well as content providers. As used herein, the term "user" refers to all members of a household who can select digital content for download, including the selection of programs for streaming, for example, via their user device(s).

In accordance with an embodiment of the invention, a content provider selects an item of digital content that a user is likely to watch or use based on the digital content they have already watched or used and provides the digital content to a local storage device during an off-peak time to the user location for local storage, prior to selection of the digital content by a user.

The digital content may be video on demand programs, advertising, and/or online interactive video game software updates, for example. It should be understood that reference to "video on demand program(s)", "video program(s)" and "program(s)" herein includes "audio-visual" program(s). The local storage device may be inside a user's residence, which may be a user's home or apartment, for example. The user's residence may also be multi-unit residence, where the local storage device services each unit in the residence. Examples of multi-unit residences include apartment buildings, dormitories, and assisted living and nursing homes, for example. A hospital may also have a shared local storage device for use by patients in their rooms. As used herein, a "local storage device" is a storage device that is within a local area network of a user, such as within the user's residence. The residence may be a single residence, such as a home, a multi-unit residence, such as an apartment building, dormitory, assisted living facility, and nursing home, for example. The user can then watch or use the digital content when desired, without streaming the program during a peak time.

A large amount of advertising is also streamed to user devices across the Internet during peak time periods, either as part of a program or separate from programs for insertion into a program, as is known in the art. Advertising that is streamed during a peak time period may need to be streamed at low definition due to network congestion, network capacity, or to reduce transmission costs, for example. If downloaded during an off peak time period and stored in a local storage device, however, the advertising may be streamed at a higher or highest available definition at the appropriate time, even if a respective user has a lower speed Internet service or speed, such as DSL, for example. The advertising videos served from a local storage device may be both higher fidelity and more responsively streamed, for example.

Software updates to online interactive video games, which may be provided to fix software defects and/or to refresh content, for example, may be very large and downloading such software updates may require a large amount of network bandwidth. Some downloads may be 10s of Gigabytes in size, for example. Due to the size of these software updates, downloading of software updates to online interactive video games during peak time periods of the network also contribute to network congestion and the problems associated with it. Downloading software updates for online video games during an off peak time period would also be advantageous to decrease network utilization during peak time periods. In accordance with embodiments of the invention, software updates for online interactive video games are downloaded to a local storage device during an off peak time period. Other non-video downloads, such as other software updates, may also be downloaded to a local storage device during an off peak time period, in accordance with embodiments of the invention.

In accordance with an embodiment of the invention, a method of operating a local storage device in a broadband communication network is disclosed, where the local storage device is within a local area network of at least one user device. The method comprises receiving, by the local storage device, during an off peak time period of the broadband communications network, at least one item of digital content from at least one digital content provider, via the broadband communications network. The item of digital content is selected by a respective content provider for download to a respective user based on the respective user. The received digital content is stored in the local storage device. A selected one of the stored digital content is provided from the local storage device to a user device in response to a request from the user device.

In accordance with another embodiment of the invention, an apparatus is disclosed comprising a processing device and storage. The processing device is configured to receive a first listing of items of predicted digital content a user device is likely to request for download from a plurality of digital content providers, via a broadband communication network. The processing device is further configured to create a download plan based on the received first listings, where the download plan includes a second listing of items of predicted digital content from each of the first listings and is in an order that the predicted digital content is to be requested from respective content providers. The processing device is further configured to request items of predicted digital content from respective content providers in the order of the second listing. The processing device is further configured to receive the requested items of predicted digital content from the respective content providers during an off peak time period of the broadband communication network and store the received items of predicted program content in the storage. The processing device is further configured to receive a request from a respective user device for an item of predicted digital content and provide the requested item of predicted digital content to the user device if the item is stored in the storage.

In accordance with another embodiment of the invention, a method of providing digital content to a user device by a content provider is disclosed. The digital content is provided via a broadband communication network having a first time period of network utilization and a second time period of network utilization less than the network utilization of the first time period. The method comprises predicting at least one item of digital content a user device is likely to request for download, by a processing device. A listing is prepared containing the at least one predicted item, by the processing device and the listing is sent to a local storage device of the user, via a network, by the processing device. A request is received from the local storage device for a predicted item on the listing and the requested item is downloaded, via the broadband communication network, during the second period of the broadband communication network, for storage by the local storage device. The downloaded item is then available to a user device of the user on request of the user device.

In one example, prior to downloading the at least one predicted item of digital content to the local storage device, a request is received from the local storage device for an application token, if the user of the user device authorized the content provider to send predicted items of digital content to the local storage device, via the broadband communication network. The application token is sent to the user device, via the broadband communication network, and the user device sends the received application token to the local storage device. The application token is received from the local storage device, the application token is authenticated, and if the application token is authenticated, the listing is sent to the local storage device, via the broadband communication network.

In accordance with another embodiment of the invention, a system for downloading digital content to user devices, via the Internet, is disclosed comprising a first content provider configured to provide digital content to user devices, across the Internet, and an Internet service provider, wherein the first content provider provides digital content to user devices via the Internet service provider. A local storage device is at a user's residence. A router is also provided at a user's residence, configured to provide communication between a user device at the user's residence and the Internet, communication between the local storage device and the Internet, and communication between a user device at the user's residence and the local storage device. The first content provider is configured to predict at least one item of digital content likely to requested by a respective user device and provide the at least one item of predicted digital content to the local storage device via the Internet and the router, for storage, during an off peak time period of the Internet service provider. The router is configured to direct a request for an item of digital content from a user device to the first content provider, to the local storage device. The local storage device is configured to receive predicted digital content from a plurality of content providers, via the Internet service provider and the router, and to provide a requested item of digital content to the user device in response to the directed request, if the requested item of digital content is stored by the local storage device, via the router.

Shifting even a small amount of peak network utilization to an off peak time period could provide advantages to a multi-service operator, ISP, and/or content provider. For example, in accordance with some embodiments of the invention, at least about 2% may be shifted to an off peak time period. In some examples, up to about to about 25% or more of peak network utilization is shifted to an off peak time period. In another example, from about 5% to about 20 percent of peak network utilization is shifted to an off peak time period. In another example, from about 7% to about 15% of peak network utilization is shifted to an off peak time period. About 10% may be shifted, for example. As used herein, the term "about" means plus or minus 10%.

The term "likely" as used herein means that the probability that a user will select a respective item of digital content for download is higher than the probability that the user will select any other item.

BRIEF DESCRIPTION OF THE FIGURES

FIG. 1A is a block diagram of an example of a content delivery system ("CDS") 100A for implementing embodiments of the invention;

FIG. 8A is a flow diagram of an example of a first authentication process for authenticating the user;

FIG. 8B is a flow diagram of an example of a second authentication process for confirming that the user has authorized the local storage device to receive manifests by the user;

FIG. 9 is a flow diagram of an example of a process for obtaining manifests of predicted programs by a local storage device, in accordance with an embodiment of the invention;

FIG. 16 is a bar chart of an example of the network utilization of FIG. 15, when a portion of network usage in the peak time period is shifted to an off peak time period, in accordance with an embodiment of the invention.

DESCRIPTION OF THE EMBODIMENTS

In accordance with an embodiment of the invention, digital content available for download by users from one or more content providers is downloaded to a local storage device of respective users during an off peak time period, making the digital content available for download when selected by a user device. Providing selected digital content during an off peak time period decreases network utilization during peak time periods, improving performance and decreasing costs for users, content providers, and network providers. The digital content may be on demand video programs, advertising, and software updates, such as software updates for online interactive video games, for example. In one example, a peak time period for a weekday for a respective ISP is in the range of from 6 PM to 10 PM Eastern Standard Time ("EST"). The peak time period may be later on weekends. An off peak time period may be a time period outside of the peak time period. In one example, digital content is downloaded during an off peak time period from 12 AM to 5 AM EST. These time periods are merely exemplary and can vary among ISPs. Multi-service content providers, and other content providers may also have different peak and off peak time periods.

Figure 15:
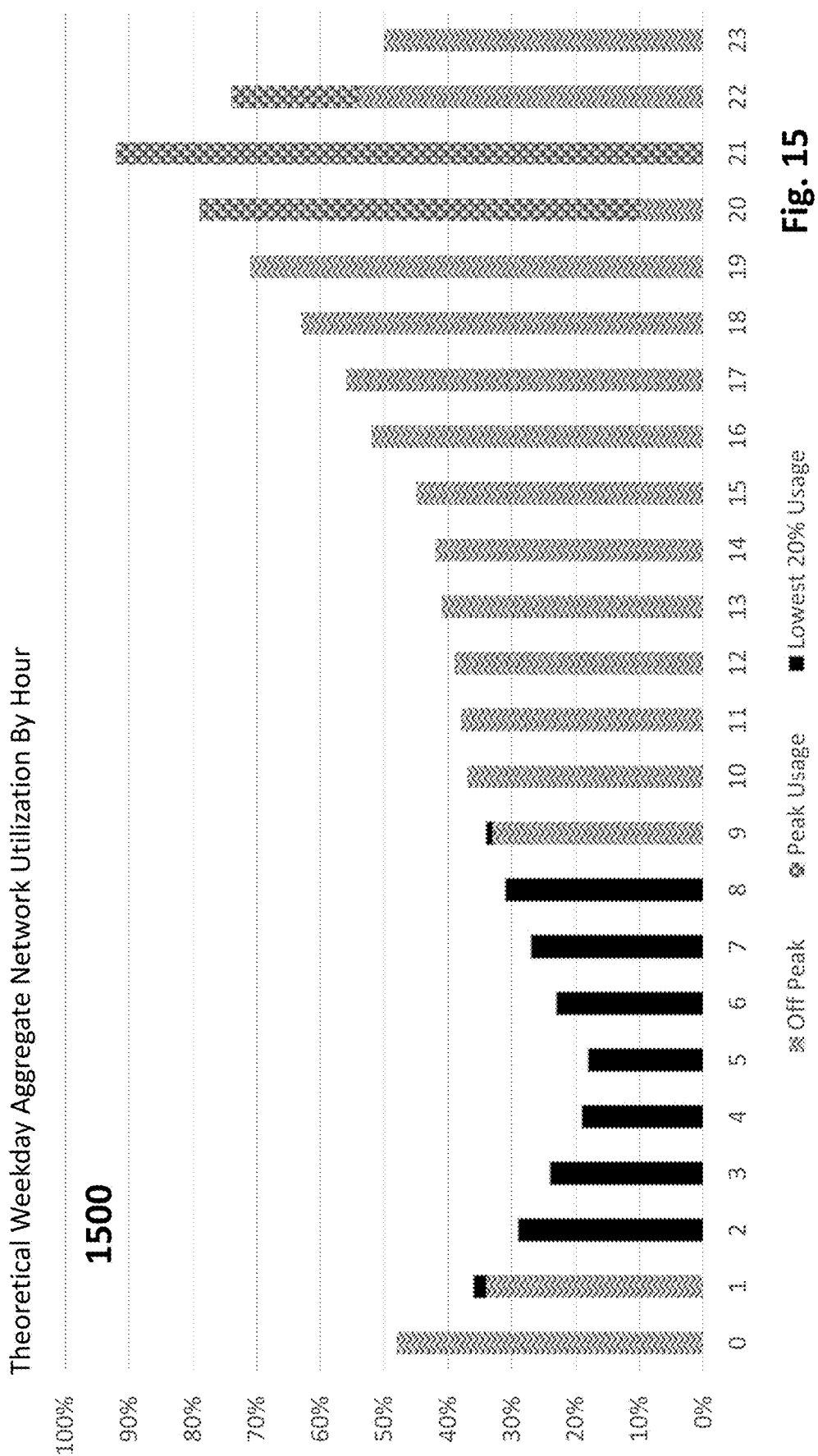
FIG. 15 is a bar chart of example of the aggregate network utilization by hour in a 24 hour time period of an exemplary multi-service operator, ISP, or content provider.

FIG. 15 is a bar chart 1400 of example of the aggregate network utilization by hour in a 24 hour time period of an exemplary multi-service operator, ISP, or content provider. The aggregate network utilization includes all types of network utilization, including downloading digital content, such as streaming programs and software updates; Tik Tok and YouTube downloads; website browsing, etc. Streaming program content typically makes up the majority of the aggregate network utilization. The percent of the network utilized is shown in the Y-axis (from 0%-100%) for each hour of the day from hour 0 (corresponding to 12 midnight), to hour 23 (corresponds to 11 PM). The maximum network utilization of about 93% in this example occurs in the $21^{st}$ hour 21 (9 PM) and the minimum network utilization of about 18% in this example occurs in the $5^{th}$ hour (5 AM).

In this example, a peak time period is indicated by crosshatch shading from about 8:55 PM to about 10:15 PM. It is noted that in hour 20 (8 PM) about 90% of the bar is shaded by cross-hatching, indicating that about 90% of the latter part of the hour 20 (starting at about 8:06 PM) is considered to be part of the peak time period while about 10 percent of the bar (from 8:00 PM to 8:06 PM) is indicated by wave hatching, indicating that the 1.0 percent of the hour is not in the peak time period. Similarly, about 20 percent of earlier part of the hour 22 (10 PM) is in the peak time period. The remainder of the $22^{nd}$ hour (from about 10:15 PM to about 10:50 PM) is considered to be off-peak in this example. FIG. 15 also indicates a time period of the lowest 20% of the network usage, from about 1:05 AM to about 9:05 AM, by solid black shading.

In accordance with an embodiment of the invention, at least some items of digital content, such as streaming programs, advertising, and/or software updates for online interactive games, for example, which are requested by a user via a user device during a peak time period (from about 8:55 PM to about 10:15 PM in the example of FIG. 15), have been previously provided to a local storage device of the respective user during an off peak time period (such as from about 1:04 AM to about 9:05 AM in the example of FIG. 15). In other examples, the off peak time period may be in a time period of the lowest 20% network usage, for example. An Internet service provider or multi-service operator may determine the peak and off peak time periods for the utilization of their network. A content provider may also determine the peak and off peak time periods for the utilization of their network.

FIG. 16 is a bar chart 1500 of an example of the network utilization of FIG. 15, when a portion of network usage in the peak time period is shifted to an off peak time period, in accordance with an embodiment of the invention. In this example, approximately 20% of the network utilization during the peak time period is shifted to the time period of the lowest 20% of network utilization decreasing the network utilization during the peak time period and increasing the network utilization in the off peak time period. In other examples, more or less of the network utilization may be shifted to an off peak time period, such as the lowest 20% of network utilization, or other amounts of network utilization, for example, as determined the respective multi-service operator or ISP. The network utilization during off peak time period from hour 1 (1 AM) to hour 9 (9 AM) is increased, as indicated by unshaded blocks 1502. As shown in FIG. 15, the network utilization is flattened to decrease the peak network utilization and increase the minimum network utilization. In this example, network utilization is flattened so that during the peak time period the maximum network utilization is lowered from over 90% at hour 21 (9 PM) to about 62% between hour 18 (6 PM) and hour 19 (7 PM). It is noted that in this example, hours 18 and 19 are not considered to be within the peak time period. In other examples some or all of the hours 1.8 and 19 may be within the peak time period of a respective network. The minimum network utilization is increased from about 19% in hour 5 (5 AM) to about 28% at hour 5 (5 AM). In shifting network utilization to the off peak time period, care should be taken not to create a new peak time period. This may be avoided by adequately spreading the download of predicted items of digital content over the off peak time period and not shifting too much of the network utilization from the peak time period to the off peak time period. It is noted the exact numbers are exemplary and are not meant to limit the scope of the invention.

Network utilization is lowered during a peak time period and increased during an off peak time period in accordance with embodiments of the invention by predicting digital content a user is likely to select and providing the predicted digital content to a local storage device of a user during an off peak time period, before the digital content is selected by the user. In one example, a content provider may predict the digital content a user (and/or user device) is likely to select for streaming based on the digital content already streamed by the user. When an item of digital content that has already been provided to the local storage device is selected by the user, then the digital content is streamed from the local storage device instead of from a content provider across the network.

Examples of digital content that may be streamed during an off peak time period include one or more television programs, including one or more seasons of a program, an entire series of a program, a movie, a documentary, a YouTube video (which are all referred to collectively herein as a "program" or "programs"), advertising, including local advertising and/or personalized advertising, for example, and/or software updates, such as updates for online interactive video games, for example.

A user may subscribe to one or more content providers for streaming content. The one or more content providers include one or more multi-service operators, such as Charter Communications; Altice USA, Long Island City, NY; Comcast Cable Communications, LLC, Philadelphia, Pennsylvania; and Cox Communications, Atlanta, Georgia, for example. Multi-service operators provide multiple services, including ISP services, as cable TV, telephone services, and/or wireless services, for example. Charter Communications, for example, provides ISP services, as well as providing both live streaming broadcast programs in accordance with a broadcast schedule over a wide geographic area and on demand streaming programs to respective users upon request. Multi-service operators may develop their own programming as well as acquire programming from other program sources.

One or more of the content providers may also be on demand streaming content provider, such as Netflix, Amazon Prime, Hulu, and/or Disney Pius, for example, which provide programs to subscribers via the Internet, for example. On demand streaming content providers typically contract with one or more multi-service operators or ISPs to provide Internet access in order to stream their programs. Streaming content providers may also develop their own programming and acquire programming from other program sources. On demand streaming content providers do not typically provide live streaming content.

One or more content providers can also be a provider of online interactive video games, such as Sony Corporation. Tokyo, Japan ("Sony"), and/or Microsoft, Corporation, Redmond, Washington ("Microsoft"), and Nintendo, for example. Online interactive video games are typically played on game consoles. Online video game providers also typically contract with one or more multi-service operators or ISPs to provide Internet access in order to download their programs and software updates to their programs.

In accordance with embodiments of the invention, one or more content providers select items of digital content from their respective collection of digital content that user is likely to select and downloads the digital content to a local storage device of a respective user during an off peak time period. Items of digital content, such as programs, may be selected for download by respective content providers by predicting the programs likely to be watched by a respective user based on the user's viewing patterns. The programs are then available to the user for selection. If the user selects a program stored on the local storage device during a peak time period of the network, it will not be necessary to download the program across the network during the peak time period. In another example, programs viewed from a first content provider may be used by a second content provider to predict programs to provide during the off peak time period. Content providers may agree to provide such information to each other, for example.

An example of a pattern may be watching two episodes of a program series in a row, such as watching two episodes of Friends in a row, on the same night. It may then be predicted that the user will watch the next episode, which would then be provided during an off-peak time. In another example, if a user has watched two or more programs in a series in a row, on the same night, then it is predicted that the user will finish the entire season of the program. The episodes of the remainder of the season would then be provided during an off-peak time period. In other examples of patterns, it is not necessary that the user watches the two episodes on the same night, and the pattern may require that more episodes be watched. Machine learning may be used to predict programs a respective user is likely to stream based on their past viewing history.

Instead or along with user viewing patterns, a content provider may also select the digital content to provide to respective users by predicting programs a user is likely to stream based on demographics, geographic location of the user, and/or user preferences provided during a set-up procedure, for example. In another example, a content provider may select the content to provide by predicting programs a user is likely to stream based on the most popular programs provided by the content provider in a time period, such as the last week, month, or year, for e, ample. A content provider may select programs and/or advertising to provide during an off peak time period based on upcoming marketing campaigns, or a date or a time of the year (such as a holiday or season, for example). Program prediction may be based on one or more of the above and other criteria, for example. The programs are then available to the user for viewing at any time, without requiring streaming of the programs across the network during peak hours.

In another example, if a user has downloaded an online interactive game to their gaming console, then it can be predicted that updates to the game are needed. When the updates become available, they may be provided during the off peak time period.

While a "user" is referred to herein, it should be understood that the term "user" includes all subscribers to a respective multi-service operator, ISP, and/or content provider, as well as all the users of a respective local storage device, such as all users in a household, for example. It may also include all users in an apartment building, dormitory, hospital, assisted living and nursing home, for example, if they share the same local storage device.

When a user selects digital content for streaming on their streaming device, the local storage may be checked to determine whether the selected program has already been downloaded to the local storage. If so, then the selected program may be streamed from the local storage to a user's streaming device, avoiding the need to stream the program across the network during the peak time period. A user may select a program for viewing via a streaming application ("App") on a respective streaming device, for example. The streaming App may also select digital content, such as local advertising, that is already stored on the local storage, A user device may include a television ("TV") coupled to an internet set-top box ("IP STB"), a smart device, such as a smart phone or smart tablet, or a laptop computer, for example, which include a streaming application ("App") for a respective provider. In another example, the user device may include a game console for playing online interactive video games and software updates for the game may be downloaded to local storage during an off peak time period. As is known in the art, game consoles obtain software updates independent of the actions of a user.

The local storage device, which is also referred to herein as a local content delivery, network ("LCDN"), may be part of a router in a user's residence, such as a user's home, or may be separate from a user's router. When separate from the router, the LCDN may also be in the user's home. In another example, where the set top box is a DVR with access to the Internet, the DVR may be the local storage device. The residence may also be an apartment building, dormitory, assisted living facility, or nursing home, for example, which may share a router and LCDN. An LCDN may also be provided in a hospital, for example. When the LCDN is separate from the router, when first set up, the LCDN requests a private IP address in a manner known in the art, in order to send and receive messages via the Internet.

In accordance with an embodiment of the invention, a listing or manifest of predicted digital content may be prepared and sent to the local storage device, when requested by the local storage device. The manifest may include a listing of URLs or other identifiers of the predicted digital content in the database of programs stored by respective content providers, for example.

After a manifest is provided to the local storage device, digital content in the manifest may be requested by the local storage device for download from the content provider during the off peak time period.

The predicted programs are thereby available locally if a user decides to watch any of them, which will decrease the amount of digital content that needs to be streamed during a time of high network usage. This may significantly decrease the volume of traffic during high peak time periods, improving performance and decreasing costs.

When multiple content providers provide streaming content to a user, manifests and predicted programs may be provided by each content provider based on the programs viewed by the user. In accordance with an embodiment of the invention, when a local storage device is not large enough to store all the digital content listed in the manifests provided by each content provider, the local storage device or other processing device may be configured to identify the digital content that will be requested from each content provider.

It is noted that there is minimal cost to incorrect predictions or selections of digital content to send to a local storage of a user during the off peak time period because the predicted programs are being sent during a time of low network usage. Since the local storage device may become full of predicted digital content, some or all of which may not be used, the local storage device may be managed to delete predicted programs after a program is streamed or after a period of time that a predicted program is not watched, creating room for new predicted programs.

System

FIG. 1A is a block diagram of an example of a content delivery system ("CDS") 100A for implementing embodiments of the invention. In this example, a content provider that is also an ISP, identified as content provider/ISP 1, is shown. In this example, two other content providers, content provider 2 and content provider 3 are shown. Collectively, the content providers in the example of FIG. 1A are referred to as content providers 1, 2, 3. More or fewer content providers may be part of the CDS system 100. A separate ISP (not shown may be provided instead of or along with the content provider/ISP 1 to provide Internet access for one or both of the content providers 2, 3, for example. The content provider/ISP 1 may be a multi-service operator such as Charter Communications, for example. An example of a content delivery system that may be implemented is described in more detail in U.S. Patent Publication No. 2016/0360282, which is assigned to the assignee of the present application and is incorporated by reference herein.

The content providers 2, 3 may be on demand streaming content providers such as Netflix, Amazon Prime, or Disney Plus, for example. In another example, one or more of the content providers 2, 3 may be a provider of online interactive video games, such as Sony, Microsoft, and Nintendo Co, Ltd., Kyoto, Japan ("Nintendo"), for example.

Figure 1B:
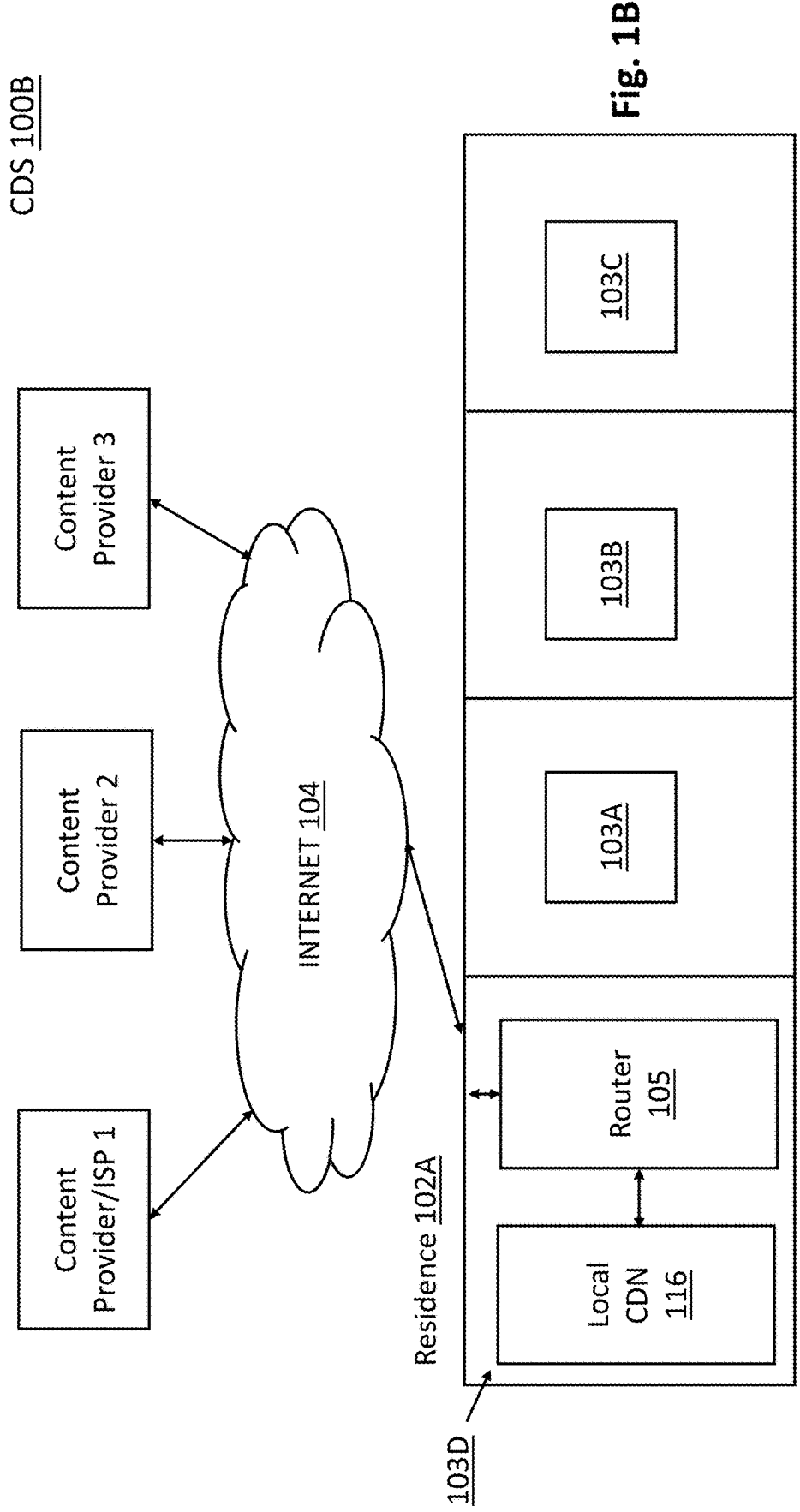
FIG. 1B is an example of a CDS, which is the same as the CDS of FIG. 1B, except that the residence is a multi-unit residence.
Figure 2A:
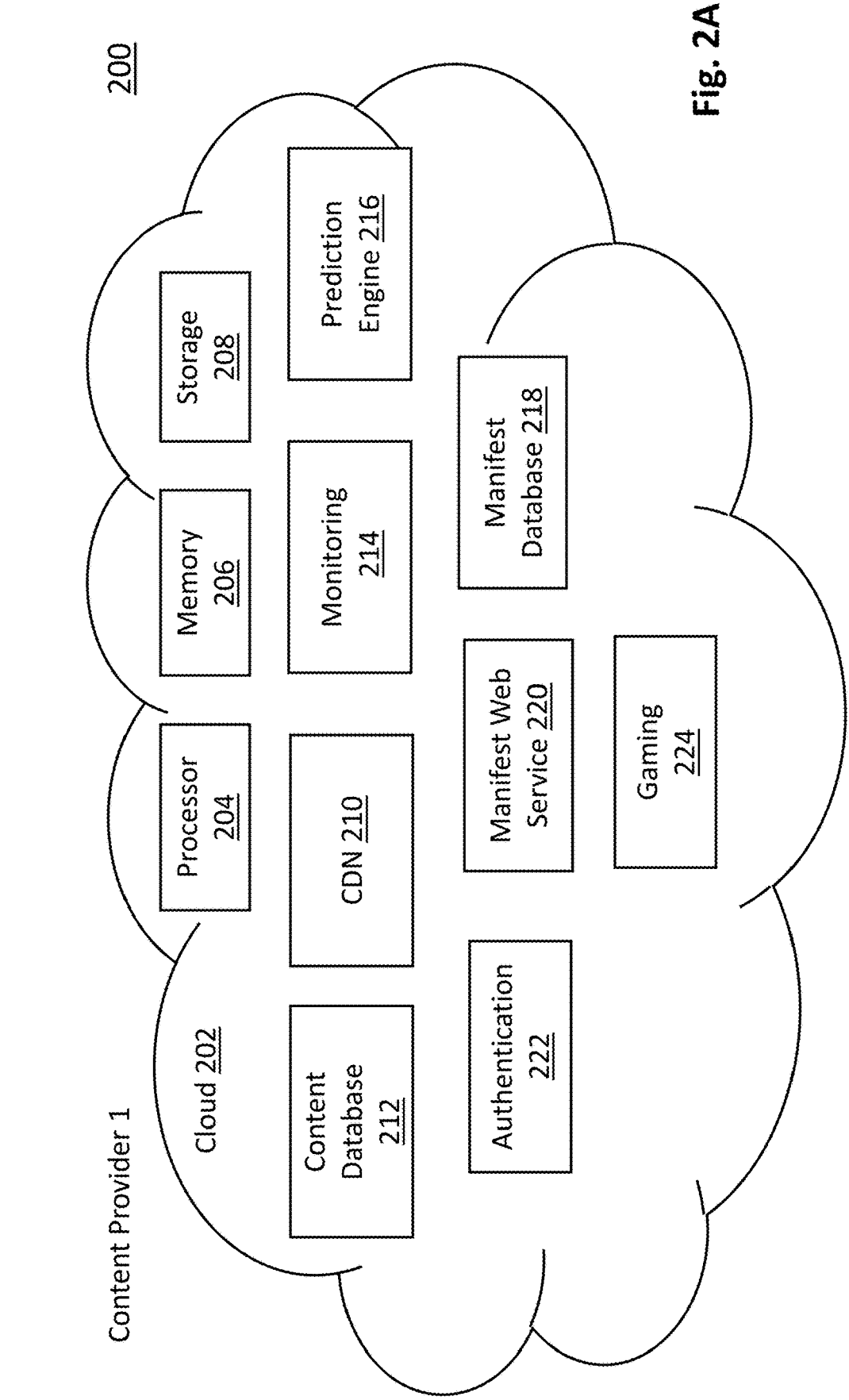
FIG. 2A is a block diagram of an example of a portion of the content provider/ISP of FIG. 1A that enables the provision of streaming programs, in accordance with an embodiment of the invention.

The content providers 1, 2, 3 stream digital content to respective residences 102A, one of which is shown in FIG. 2A via a network, such as the Internet 104. In FIG. 1A, the residence 102A is a single unit residence or home, for example. In FIG. 1B, the residence 102B is a multi-unit residence. The content provider/ISP 1, which in this example is Charter Communications, also broadcasts live streaming programs to users via the Internet 104 and/or other broadcast networks in accordance with a broadcast schedule. Some or all of the live streamed broadcast content may also be available later on demand for streaming. In the residence 102A, a router 105 is provided to connect devices in the residence to the Internet 104 by direct electric connection and/or wireless connection to the respective devices. The router 105 acts as an interface between the public network including the Internet 104 and devices in the residence 102A, which are part of a local network. Instead of providing programming and advertising to a user via the Internet, live streaming and streaming broadcast content may be provided through another type of network, such as a QAM based network, for example.

In this example, the private home network includes an Internet set-top box ("IP STB") 106 coupled to the router 105 and to a television ("TV") 108 by direct electrical connections. The TV 108 may be coupled to the set-top box IP STB 106 via a cable, such as a coaxial cable, for example. The router 105 may include a modem or a separate modem may be provided (not shown) in the house, between the router 105 and the Internet 104, as is known in the art. Suitable routers may include a Broadcom chipset provided by Broadcom Inc., San Jose, California or a Qualcomm chipset provided by Qualcomm Technologies Inc., San Diego, California, for example. An example of a combined modem-router that may be used is the NETGEAR Nighthawk Cable Modem WiFi router Combo C700, available from Netgear Inc., San Jose, California.

The IP STB 106 provides an interface between the television 108 and the Internet or other such broadband network 104, via the router 105. IP STBs 106 are well known in the art and commercially available. As used herein, the term "set top box" also encompasses media digital players, such as Roku, Apple TV, Google Chromecast, for example. Digital media players are also referred to as over the top ("OTT") devices. The set top box may also be a cable set top box for use in a cable television system.

A remote control 110 is wirelessly coupled to the IP STB 106 to control at least certain operations of the TV 108, in a manner known in the art. The remote control 110 may include an infrared transmitter, an RF transmitter, a Bluetooth transmitter, or a Zigbee transmitter, for example, to enable wireless control of the TV 108, as is known in the art.

The IP STB 106 switches between channels of the TV 108 under the control of the remote control 110, decodes MPEG signals defining audio-visual programs corresponding to a respective channel that are received from the headend 110 for display on the TV associated with the IP STB, and to convey information entered by a user to a respective content provider, for example, in manners known in the art. A user may also select broadcast programs on a program guide displayed by the IP STB 106 with their remote control 106. Content providers such as Charter Communications broadcast content on respective broadcast channels and streams on-demand programs on an on-demand channel. A user may also select on-demand programs via a program guide. The IP STB 106 may be part of the TV 110.

Streaming programs provided by on demand streaming content providers, such as Netflix, Amazon Prime, and Disney Plus, for example, may also be decoded by the IP STB 106 viewed on the TV 108 by users in the residence 102A. If the TV 108 is an Internet TV (otherwise known as a smart TV), it may include one or more applications ("Apps") for decoding and viewing streaming content from respective content providers. For example, if the content provider 2 is Netflix, then a Netflix App is used to decode and view a program streamed by the content provider 2. If the content provider 3 is Amazon Prime, and Amazon Prime App is used to decode and view a program streamed by the content provider 2.

A smart device 112, such as a smart phone, a tablet, or other such smart device is shown coupled to the router 105 in the residence 102A in FIG. 1A. The coupling is wireless. A laptop 114 is also shown in FIG. 1A, connected to the router 105 via a direct, electrical connection or wirelessly. A smart device 112 and a laptop 114 may receive broadcast programs and streaming content via Apps for each content provider, as well. Programs may be selected via a program guide displayed on the smart device 112 and laptop 114. Selected programs may be streamed to the smart device 112 and/or the laptop 114 via the Internet 104 and the router 105. Streaming Apps on the smart device 112 and laptop 114 may decode and cause display of the smart device 112 and/or laptop 114, in manners known in the art.

A gaming console 115 may also be provided in the residence 102A, coupled to the router 105 by a direct, wired electrical connection or wirelessly. Users play interactive online games via the game console 115 provided by respective gaming content providers. The gaming console 115 may be a Sony PlayStation, provided by Sony, a Microsoft Xbox, provided by Microsoft, or a Nintendo Switch provided by Nintendo, for example.

The IP STB 106, smart device 112, laptop 114, and game console 115 are also referred to collectively as "user devices."

While FIG. 1A shows only one TV 108, one remote control 110, one IP STB 106, one smart device 112, one laptop 114, and one gaming console 115 in one residence 102A for ease of illustration, it should be understood that where the residence 102A is a home, additional IP STBs and remote controls 110 may be coupled to other TVs 106 in the same home. In addition, multiple smart devices 112, laptops 114, and/or gaming consoles 115 may be provided in the residence 102A. Multiple other residences 102A are also coupled to the Internet 104, which may have similar configurations. In other examples, some residences 102A may not include a TV 108, a smart device 112, a laptop 114, or gaming console 115.

In accordance with this example of an embodiment of the invention, a local storage device or local content delivery network ("LCDN") 116 is also provided in the residence 102A, either as part of or connected to the router 105. The LCDN 116 is a local storage device for storing predicted digital content, such as programs, advertising, and/or game updates, for example, provided by a respective content provider 1, 2, 3. When separate from the router 105, as shown in FIG. 1A, the LCDN 116 may be connected to the router by a direct, wired electrical connection or wirelessly.

In one example, predicted digital content is provided by a respective content provider 1, 2, 3 to the router 105 during an off-peak time period via the Internet 105 and the router provides the predicted programs to the LCDN 116 for local storage. The LCDN 116 may be a storage device having a capacity of at least 1 gigabyte, for example, which is sufficient to store from about 50 to about 100 sixty minute programs, for example. A larger or smaller LCDN 116 may be provided. The LCDN 116 is described in more detail with respect to FIG. 7, for example. If the IP STB 106 is also a DVR, the IP STB may also be a local storage device for storage of predicted programs in embodiments of the invention.

FIG. 1B is an example of a CDS 100B, which is the same as the CDS 100A, except that the residence 102B is a multi-unit residence. While in the example of FIG. 1B, three units 103A, 103B, 103C are shown, the multi-unit residence 102B may include two units or a larger number of units, such as in an apartment building, dormitory, assisted living facility, or nursing home, for example. In FIG. 1B, the router 105 and the LCDN 116 are shared by the entire residence 102B. The router 105 and the LCDN 116 are shown in a common area 103D, such as a basement, for example. Each unit 103A, 103B, 103C includes one or more IP STBs 106 and TVs 108, smart devices 112, laptops 114, and/or game consoles 115, as shown in FIG. 1B.

FIG. 2A is a block diagram of an example of a portion of the content provider/ISP 1 that enables the provision of streaming programs, in accordance with an embodiment of the invention. As discussed above, the content provider 1 in this example is Charter Communications. The ISP functions of the content provider/ISP 1 are well known in the art and are not shown in FIG. 2A. The content provider 2 and the content provider 3, which are on demand streaming content providers such as Netflix and Amazon Prime, for example, may have the same configuration or a different configuration that provides the same functionality as described with respect to FIG. 2A.

In this example, the portion 200 of the content provider/ISP 1 shown in FIG. 2A is implemented in a cloud environment 202 by cloud applications ("Apps"). Each cloud App may include a plurality of microservices configured to perform aspects of the described functions associated with each identified cloud App. The cloud 202 may be a private cloud of the content provider 1, for example. The cloud Apps may also be hosted in a cloud platform, such as Amazon AWS provided by Amazon or Microsoft Azure, provided by Microsoft, Redmond, Washington, for example. The cloud Apps described herein are run by one or more virtual processing devices 204, as is known in the art, by executing code defining each cloud App. Other virtual components, including virtual memory 206, such as virtual random access memory ("RAM") or virtual dynamic RAM ("DRAM"), for example, and virtual storage 208, such as a one or more hard drives or solid state storage devices ("SSDs"), are also provided as needed. It is noted that while exemplary cloud Apps are shown in FIG. 2A, functions of separate cloud Apps may be combined, and different cloud Apps may be provided to accomplish the functions described herein. While discussed with respect to the cloud environment 102A, the functions performed in the cloud environment 102A may also be implemented in a non-virtual environment, such as by one or more processing devices under the control of suitable software, for example. Some or all of the described functions may also be performed by a suitably configured application specific integrated circuit ("ASIC"), for example.

Digital content, including video programs available on demand for streaming, advertising, for example, is provided to households, such as the residence 102A of FIG. 1A, by a content delivery network ("CDN") cloud App 210. In the case of streaming programs, the CDN cloud App 210 identifies a program selected by a user in the residence 102A and transmits the selected program to the requesting user device via the Internet 104 and router 105 in FIG. 1A. The user may request programs via their respective streaming device, in a manner known in the art. Selection of a program and streaming of the selected program are well known in the art.

The content providers, such as content providers 1, 2, 3, store digital content available on demand for streaming in a content database 212. If advertising is also provided by the content provider, the advertising may also be stored in the content database 212. A content provider that provides gaming software, such as Sony or Microsoft, may store the gaming software and gaming software in the content database 212.

The content database 212 may also store metadata in association with respective items of digital content including such as a title of each item, a length of each item and/or the storage required to store each item rights information related to the program, such as an expiration date beyond which the respective item cannot be stored in the LCDN 116, for example, as discussed herein. The expiration date may be set by the respective content provider 1, 2, 3, for example. Confidence scores reflecting the likelihood that a respective user will request a predicted program and/or priority scores indicating the importance placed on the item by the content provider, may also be included. The generation and use of confidence scores and priority scores are discussed below.

Bitrates for respective programs may also be stored as metadata, for monitoring and reporting purposes, for example. Age appropriate ratings in accordance with the Voluntary Movie Rating System and/or TV Parental Guidelines for programs, and Entertainment Software Ratings Board ratings for software, and/or popularity ratings, such as Neilsen ratings other popularity ratings for programs, may also be included. Content providers may decide whether some information, such as ratings and/or bit rates for their programs, is to be stored.

The content database 212 may also be configured to monitor the items of digital content that has already been downloaded to a respective local storage, so that the same items are not sent during an off peak time period more than once, for example.

The content cloud database 212 is accessed by the CDN cloud App 210 for streaming digital content to a requesting streaming device. Each item of digital content may be associated with a respective URL in the content cloud database 212 and each item of digital content may be accessed by the CDN cloud App 210 in response to requests for the respective digital content based on the URL for that item, for example. While one CDN cloud App 210 and one content cloud database 212 are shown and described, multiple CDN cloud Apps and/or content cloud databases may be provided.

The content distribution network cloud App 210 retrieves digital content from the content database 212 and streams the retrieved digital content to users across the Internet 104 in FIG. 1A. Programs and advertising digital content may be streamed to user devices by the CDN 210 in a sequence of small segments or chunks via the Internet 104 and the router 10 of FIG. 1A and FIG. 1B, for example. The CDN cloud App 210 also streams digital content to local storage devices, such as the LCDN 116 of FIG. 1A and FIG. 1B, as discussed herein.

Adaptive bit streaming may be used, such as dynamic adaptive streaming over HTTP ("DASH" or "MPEG-DASH"), for example, to stream the digital content, as is known in the art. The segments are retrieved from the database 212 and streamed as confirmation is received from the device receiving the streaming program that the program continues to be viewed, as is known in the art. The database 212 stores indications of the confirmations in association with respective users, for example.

If the content provider is a provider of online interactive video games, the software updates stored in the content database 212 are typically downloaded to a respective local storage device in the form of a file so that the file may be checked by the game console 115 to ensure that the file is not corrupted. A cyclic redundancy check (CRC) may be used by the game console, for example, as is known in the art.

A monitoring cloud App 214 monitors the content database 212 to determine the digital content streamed by users. In content providers that provide on demand programs, the monitoring cloud App 214 monitors the programs requested and viewed by each respective user of a household on their respective streaming device(s). The monitoring cloud App 214 may be configured to monitor the programs viewed and the amount of time each program is viewed by scanning the database 212 for the indications of which programs a user has streamed and the length of time the user streamed each program, for example, as is known in the art.

When at least a predetermined amount of a respective program is viewed, such as at least 70% of the program, at least 80%, or at least 90% of the program, for example, an identification of that program is provided to a prediction engine cloud App 216 for use in predicting the next program a user in the household is likely to watch. The identification of the program may be the URL of the program on the database 212, for example. Other program viewing percentage thresholds may be used.

In the case of a content provider that provides interactive games, the monitoring cloud App 214 monitors the games that have been downloaded to each user to identify updates needed by the game console 115.

The monitoring cloud App 214 may also collect the digital content downloaded to the LCDN 116 that are selected by a user and provide the information to the prediction engine cloud App 216. The streaming App provided by a respective content provider 1, 2, 3 to user devices may be configured to monitor the programs and other digital content stored by the LCDN 116 that have been requested by user and to provide the information to the monitoring cloud App 214 via the router 105 and the Internet 104. The prediction engine cloud App 216 may use the information to improve subsequent predictions, for example. Programs requested by users that have already been provided to the LCDN 116 may also be part of the viewing history of respective users and analyzed by the prediction engine cloud App 216 to make subsequent predictions.

The monitoring cloud App 214 may also monitor live streamed broadcast programs watched by a user, to obtain further information that could be used by the prediction engine cloud App 216 to predict programs a user is likely to select for streaming. The monitoring cloud App 214 may be informed by the streaming App for a respective content provider, such as Charter Communications, for example, on the user device when a live streamed program provided by the respective content provider is viewed. The information may be sent by the user device to the respective content provider via the router 105 and the Internet 104 in FIG. 1A, for example.

If the IP STB 106 is also a DVR and is provided by a respective content provider 1, 2, 3, then the monitoring cloud App 214 of that content provider may also monitor live streamed programs selected by users for recording the DVR, for example.

While one monitoring cloud App 214 is shown and described, multiple monitoring cloud Apps may be provided. In another example, the content database 212 may be configured to provide the URLs or other data related to programs streamed by respective user's directly to the prediction engine cloud App 216, avoiding the need for the monitoring cloud App 214.

The identifications of the programs the user has streamed for a sufficient period of time are provided by the monitoring cloud App 214 to a prediction engine cloud App 216. The prediction engine cloud App 216 may apply an algorithm to the data, which may be in the form of titles of the program or another identifier of the viewed programs, such as the URLs, for example, to identify one or more programs a user is likely to select for viewing based on the programs already viewed. The programs may be episodes of a series, movies, documentaries, etc. The algorithm may be one or more fixed formulas, such as if a user watches one program in a series, then it is predicted that the user will select the next program in the series for streaming, and if the user watches a predetermined number of programs in a series, such as two or more programs, then it is predicted that the user will select the entire season of the program for viewing. In another example, machine learning may be used to predict programs likely to be viewed by a user based on their viewing history. Programs may also be predicted based on Favorites and/or user preferences designated by a user, for example, using machine learning. Prediction algorithms are discussed in more detail below. While one prediction engine cloud App 216 is shown and described, multiple manifest web service cloud Apps may be provided.

Predictions by the prediction engine cloud App 216 for each respective user are placed by the prediction engine cloud App 216 into respective storage locations, such object stores, of a manifest cloud database 218 for each user, for example. URLs or titles of each predicted program may be placed into respective storage locations for each user in the manifest database 218, for example. If the cloud 202 is an AWS cloud, then the manifest database 218 may be AWS cloud object storage, for example. Predictions may be performed, and then predicted programs may be placed into the respective storage locations statically, on an ongoing basis, or may be generated dynamically, after receiving a request for a manifest by a local storage device, for example.

The manifest cloud database 218 may be a secure manifest database 218. The secure manifest database 218 may be in the form of a secure file system, for example. The term "secure" is used here because in this example, in order for a user to receive the manifest, the user must be authenticated, as discussed further below. In addition, the URLs or the manifests as a whole may be encrypted and delivered using secure file transfer, for example. If there are no predictions since the last manifest has been created and sent because the user has not requested any programs to stream, then the next manifest created and sent could be empty or not sent at all. While one manifest cloud database 218 is shown and described, multiple manifest web service cloud Apps may be provided.

Figure 2B:
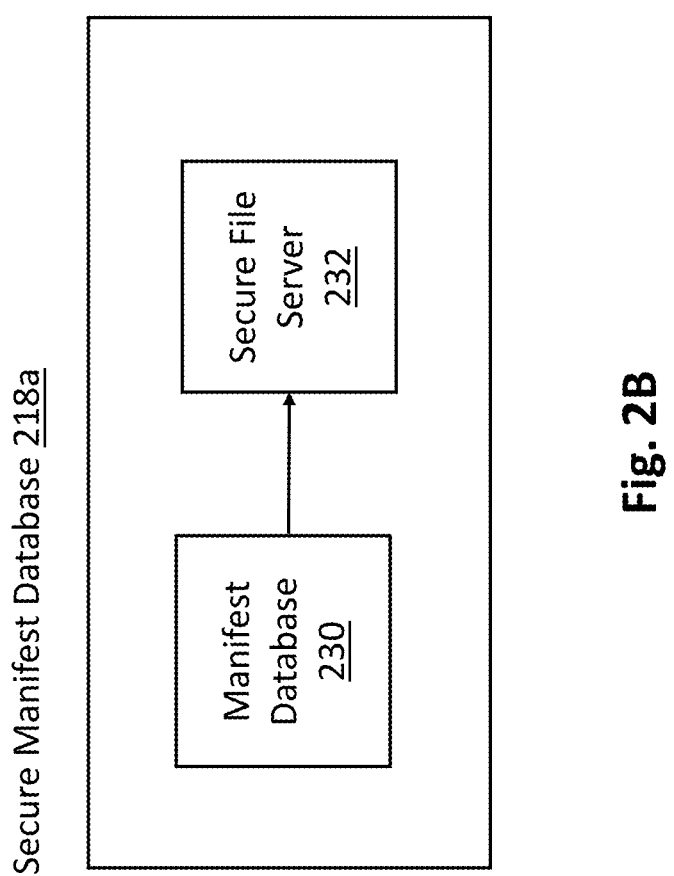
FIG. 2B is an example of a secure manifest database that may include a manifest database and a secure file server, for use in FIG. 2A.

In another example, a secure manifest database 218a may include a manifest database 230 and a secure file server 232, as shown in FIG. 2B. URLs and/or other identifying information for predicted programs for respective users are accumulated in the manifest database 218 to form respective manifests, as discussed above.

The manifest database 230 periodically sends each manifest to the secure file server 232 for storage in association with an identification of respective user. The manifests may be sent nightly, for example. If a user does not request any programs to stream over a period of time, manifests may be provided less often, such as every other night, weekly, or monthly, for example, depending on how often the user streams content. In another example, if the user does not request any programs to stream since the prior manifest, the next manifest may be empty because there is no basis to make a new prediction.

A manifest web service cloud App 220 may be provided to receive requests for the manifest from LCDNs, retrieve the manifest from the manifest database 218, and forward the requested manifest to the requesting LCDNs, as discussed in more detail below. A manifest may be provided to a respective LCDN 116 in FIG. 1A by the manifest web service cloud App 220 via the Internet and router 105 in FIG. 1A, for example. Use of the manifest web service App 220 enables load balancing, fault tolerance, and horizontal scaling of infrastructure as needed. For example, the manifest web service 220 may enable re-routing of the transmission of the manifest to a respective user around outages in the network. Use of the manifest web service cloud App 220 is optional. If the manifest web service cloud App 220 is not used, then a secure file may be sent from the manifest database 218 when requested by the LCDN.

While one manifest web service cloud App 220 is shown and described, multiple manifest web service cloud Apps may be provided.

An authentication cloud App 222 is provided to authenticate a user and to authenticate that the user has authorized that the content provider may provide a manifest to a respective router 105 and LCDN 116 of a user. Authentication is discussed further below. While one authentication cloud App 220 is shown and described, multiple authentication cloud Apps handling different aspects of the authentication process or different types of authentications may be provided.

While cloud Apps are shown and described with respect to FIG. 2A, any one or all of the functions of the cloud Apps may be performed by in a non-virtual processing environment, such as by a central processing unit, microprocessor, or microcontroller, residing on a computer or server under the control of suitable software, or combination of software and hardware, for example. These functions may also be performed by a suitably configured application-specific integrated circuit (ASIC), for example.

Figure 3:
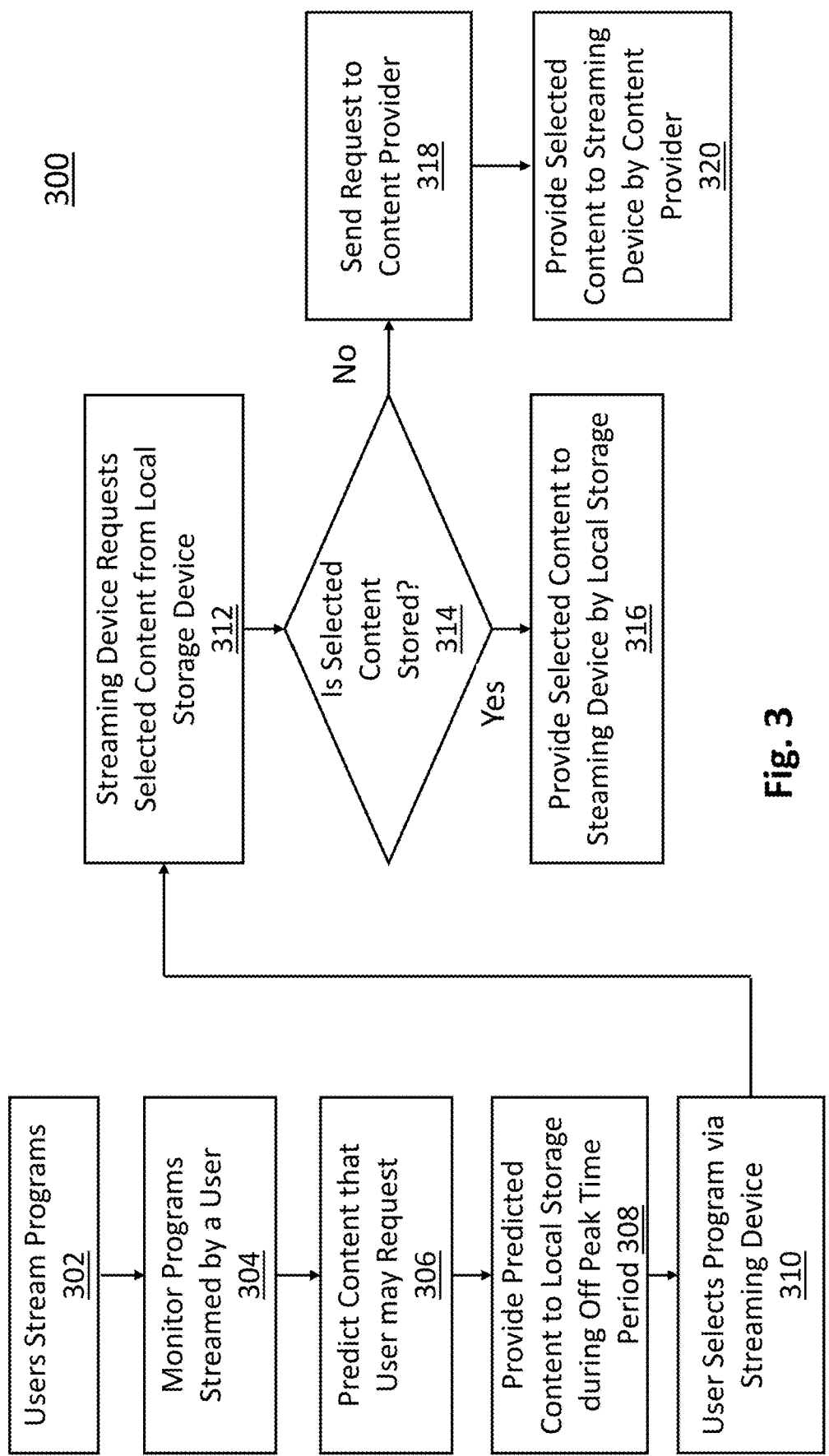
FIG. 3 is an example of a process for the operation of the system of FIG. 1A involving content providers who provide on demand programs for streaming, in accordance with an embodiment of the invention.

FIG. 3 is an example of a process 300 for the operation of the CDS 100A of FIG. 1A involving content providers who provide on demand programs for streaming, in accordance with an embodiment of the invention. Components in FIG. 1A and FIG. 2A are referred to in this example.

Users have been streaming selected programs on their streaming devices, such as their IP STB 106 for viewing on a TV 108, a smart device 112, such as a smart phone or tablet, and/or a laptop 114, for example, in Step 302. A content provider, such as the content provider 1 in this example, monitors the programs streamed by the user, in Step 304. The streamed programs may be monitored by the monitoring cloud App 214 in FIG. 2A, for example. Content provider 1, which in this example is Charter Communications, will be referred to in the remainder of the process 300 but the example is equally applicable to other content providers, such as Netflix and Amazon Prime, for example.

The content provider 1 predicts content that a user is likely to view based on the programs that have been streamed, in Step 306. The predicted content may be predicted by the prediction engine cloud App 216 in FIG. 2A, for example. The predicted content is provided to a local storage device during an off peak time period, in Step 308. The local storage device in this example is the LCDN 116 of FIG. 1A, for example. The CDN cloud App 210 (FIG. 2A) retrieves the predicted content from the program cloud database App 212 in FIG. 2A and provides the predicted content to the local storage device via the Internet 104 and the router 105 (FIG. 1A), for example.

At a time after the Step 308, when the user selects program content to stream via one of their steaming devices, in Step 310, the streaming device checks whether the selected program content is stored on the local storage device, in Step 312. The local storage device searches for the selected program, in Step 314. If the selected program content is found (Yes in Step 314), the local storage device provides the program content to the streaming device, in Step 316, via the router 105, for example.

If the local storage device does not store the selected program content (No in Step 314), then the request is sent to the content provider 1, in Step 318. The content provider 1 then provides the requested program to the requesting user device, in Step 320. The CDN cloud App 210 of the content provider 1 may retrieve the selected program from the program database cloud App 212 and stream the program content to the requesting streaming device via the Internet 105 and the router 105, for example.

Figure 4:
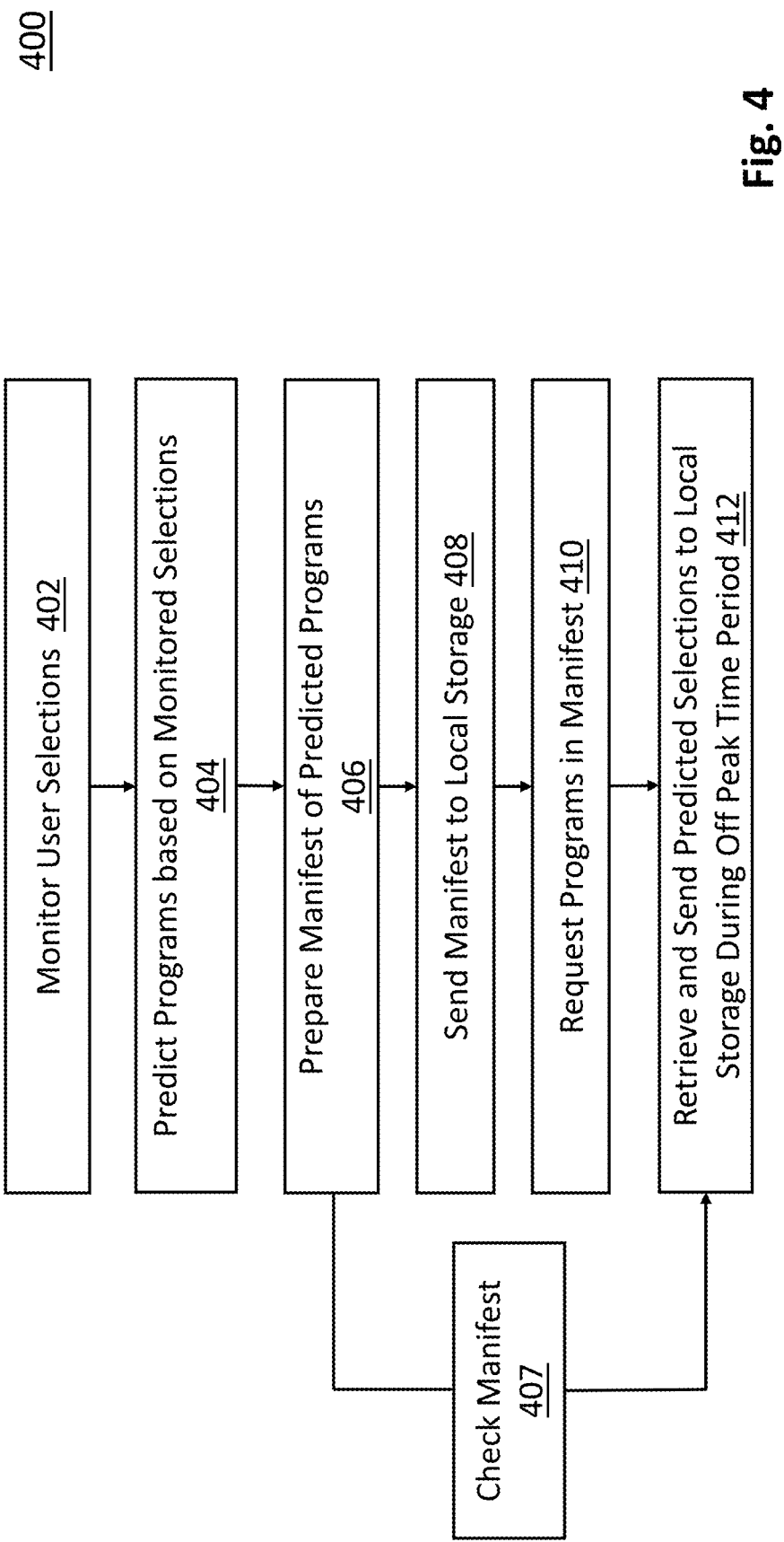
FIG. 4 is an example of a process for receiving programs in off peak time period by a local storage device based on a manifest of predicted programs, in accordance with an embodiment of the invention.

FIG. 4 is an example of a process 400 for receiving programs in off peak time period based on a manifest of predicted programs, in accordance with an embodiment of the invention. Components in FIG. 1A and FIG. 2A are referred to in this example.

As in the process 300 of FIG. 3, user selections are monitored by a content provider, in Step 402, such as by the monitoring cloud App 214. The content provider predicts programs based on the monitored selections, in Step 404. The programs may be selected by the prediction engine cloud App 216, for example.

A manifest or listing of predicted programs is prepared, in Step 406. The manifest may be prepared by the prediction engine cloud App 216 by placing URLs of predicted programs into respective storage locations for each user in a secure manifest database 218, such as a secure file system, for example. The term "secure" is used here because in order for a user to receive the manifest, the user must be authenticated, as discussed further below. In another example, the secure manifest database 218 may include a manifest database 230 and a secure file server 232, as shown in FIG. 2B. URLs and/or other identifying information for predicted programs for respective users are accumulated in the manifest database 218 to form respective manifests, as discussed above. Periodically, the manifest database 230 sends each manifest to the secure file server 232 for storage in association with an identification of a respective user or streaming service user account for a user or household. The manifest may be sent daily, before the next off peak time period, for example.

The manifest is sent to a local storage device of each user, in Step 408. The local storage device may be the LCDN 116 in FIG. 1A, for example. Predicted programs listed in the manifest are downloaded to a local storage device during an off peak time period, in Step 410. In one example, the LCDN 116 includes an clock to determine the beginning and end of the off peak time period. The clock may be part of the a processing device included in the LCDN 116 or a clock separate from the LCDN may be provided. In one example, the LCDN 116 requests the programs in the manifest during the off peak time period. In another example, the CDN cloud App 210 of FIG. 2A initiates sending of the programs during the off peak time period, as discussed further below.

Prediction Engine Cloud App

Operation of the prediction engine cloud App 216 in FIG. 2A will now be described. The prediction engine cloud App (or "prediction engine") 216 in one example may use as predictions the recommendations of the recommendation system already provided by a content provider. For example, Netflix and Amazon Prime already recommend programs for viewing to a user based on programs already viewed. The URLs of the programs recommended by the recommendation system may be stored in the manifest database 218, in the manner described above with respect to FIG. 2A. In another example, the recommendation system used by a respective content provider may be the prediction cloud App 216. Recommendation services may be provided by third parties. Adobe Target, which is available from Adobe, Inc., San Jose, California, may be used to predict programs a user is likely to select based on the viewing history of the user, for example.

In another example, the prediction engine 216 may implement recommendation or prediction algorithms that may vary in complexity. In one example, one or more if-then algorithms may be used. Examples of if-then algorithms that may be used with respect to episodes of series of programs include one or more of the following: 1) if a user watches one program in a series, then it is predicted that the user is likely to select the next program in the series for streaming (Formula 1); and if a user watches two consecutive programs of a series, then it is predicted that the user is likely to select the remainder of the season for streaming (Formula 2).

As mentioned above, since the predicted program(s) are sent during an off-peak time period, there is minimal cost to the system whether a user actually watches the program or not. Predictions do not, therefore, need to have a high probability of selection. In one example, an accuracy or hit rate, which is the rate of incidence of downloaded content being requested, of at least about 5% would provide an advantageous decrease in network utilization during a peak time period. In another example, a hit rate of from 10% to about 30% may be used. Higher or lower accuracy or hit rates may be used by respective content providers 1, 2, 3, multi-service operators, or ISPs, if desired. Hit rates may be calculated by streaming Apps for the user devices they reside on and provide that information to the monitoring cloud App 214 for providing feedback to the prediction engine cloud App 216, as discussed below. Hit rates may also be calculated by an LCDN 116. The monitoring cloud App 214 for a respective content provider may collect information from all the available streaming Apps provided by that content provider and/or LCDNs 116 and determine an overall hit rate for predicted programs downloaded to the LCDNs 116 by a respective content provider.

If for any reason, including limited storage space in the local storage device, a higher hit rate is desired, then the if-then algorithms may be modified to be more precise. For example, Formula 1 may be modified to: if a user watches two (or more) consecutive programs in a series, then it is predicted that the user is likely to select the next program in the series for streaming. Formula 2 may be modified to: if a user watches three (or more) consecutive programs of a series, then it is predicted that the user is likely to select the remainder of the season for streaming, for example.

Such formulas may be implemented in a variety of ways. In one example, it is determined whether a program selected by a user for streaming is an episode of a program series. If yes, the episodes in a series may be listed in order in a table or database. The listing may include for the TV show Friends, for example, and entry for Season 1, Episode 1, then an entry for Season 1, Episode 2, then an entry for Season 1, Episode 3, etc., for the entire series. When Season 1, Episode 1 is streamed, then the next entry in the listing, Season 1, Episode 2, may be predicted, in accordance with Formula 1. When both Season 1, Episode 1 and Season 1, Episode 2 are streamed, then all the remaining episodes of Season 1 are predicted, in accordance with Formula 2, for example. If the program requested by the user is not the first episode of the season of the requested program, the following episode in the season, the first episode in the season, and/or the first episode of the first season may be predicted.

As mentioned above, programs requested by users from the LCDN 116 may also be part of the viewing history of the user analyzed by the prediction engine 216 to make predictions. For example, if Season 1, Episode 2 of Friends was provided to the LCDN 116 during an off peak time period because the user already streamed Season 1, Episode 1, and the user streamed Season 1, Episode 2 of Friends from the LCDN 116, then the prediction engine 216 could be configured to predict that the user will watch the remaining episodes of Season 1 of Friends, as described above. The streaming App provided by a respective content provider may be configured to monitor the programs stored by the LCDN 116 that have been requested by a user and to inform the monitoring cloud App 214, as described above.

Flags may be set in a table or database listing consecutive programs for each program series for respective users as programs are viewed. The flags may then be checked to identify consecutive programs of a series that have been viewed in order to make respective predictions. The formulas may be modified to include time periods within which consecutive programs need to be viewed to lead to a prediction. For example, Formula 2 may include a requirement that two consecutive programs be viewed within 24 hours or 48 hours of each other. Time periods may be incorporated in the analysis by including timestamps in association with the flags, for example.

In another example, one or more machine learning algorithms may be used to predict other likely program titles for the manifest. In one example of a machine learning algorithm that may be used in embodiments of the invention, programs are identified that are similar to programs previously streamed by a user based on metadata tags attached to the programs. In another example, a binary logistical regression algorithm may be used to generate predictions, as is known in the art. In another example, collaborative filtering recommendation type techniques may be used to determine potential programs of interest based on programs selected by similar users, as is known in the art. Other examples of recommendation engines using various techniques that may be used to predict programs for use in embodiments of the invention are described in U.S. Pat. Nos. 10,475,050, 9,338,489, and 9,129,214, which are assigned to Netflix, and are incorporated by reference herein. Other techniques known in the art may also be used.

A machine learning algorithm may be trained with a training set of data collected by the content provider. The training set may include histories of user selections over time that have been collected by the respective content provider. The training set may include histories of on demand streamed content, for example. The training set may also include histories of live streamed content. The machine learning algorithm may be periodically re-trained based on an updated training set including current selections by a respective user from the content provider 1, 2, 3 and from the LCDN 116 to keep the algorithm current and avoid model drift, for example.

The desired hit rate versus the actual hit rate for all users may also be taken into consideration during re-training.

Machine learning algorithms may be trained for groups of users based on some commonality of viewing habits, for example. Machine learning algorithms may be trained for individual users.

The machine learning algorithm may also use as feedback programs actually streamed by the user from the LCDN 116 and/or the content provider to improve the predictions. Similarly, the machine learning algorithm may also use as feedback live streamed programs watched by the user to improve the predictions. The machine learning algorithm may take into consideration user demographics and/or user preferences provided during a set-up procedure, for example. As noted above, predictions do not need to have a high probability of selection.

Deep machine learning algorithms may make more sophisticated predictions than fixed formulas. For example, it may be found that after completing a season of certain programs, a user, or certain users (based on their demographics, geographic location, preferences, and/or their viewing history, for example), are more likely to watch a different program. For example, after watching Season 1 of Breaking Bad, a respective user may be more likely to watch Episode 1 of Season 1 of Better Call Saul than Season 2, Episode 1 of Breaking Bad. In this case, Season 1, Episode 1 of Better Call Saul (or all of Season 1 of Better Call Saul) may be provided to the user instead of or along with Season 2, Episode 1 of Breaking Bad (or all of Season 2 of Breaking Bad). In another example, the machine learning algorithm may determine that if a user watches the Macy's Thanksgiving Day Parade live, the user is likely to select Miracle on $34^{th}$ Street or another holiday program for streaming. Similarly, the machine learning algorithm may determine that if a user watches CNN for a period of time, the user is likely to select for streaming a CNN special. In another example, machine learning may enable the prediction engine cloud App 216 to predict that a respective user is likely to select a movie or documentary after watching one or more episodes or seasons of a particular program.

FIG. 4 is an example of a process for making program predictions and providing the predictions to a local storage device, in accordance with an embodiment of the invention. Streamed programs viewed on-demand are monitored, in Step 402. Live streamed programs, if provided by a respective content provider, may also be monitored. As discussed above, a streaming App provided by a respective content provider may monitor streamed program content requested by a user and provide the information to the monitoring cloud App 214. A streaming App may also monitor live, broadcast programs received by a user device and provide the information to the monitoring cloud App 214. A content provider such as Netflix or Amazon Prime, which only provides on-demand programs, in this example only monitors the requested on demand programs.

Predictions of one or more programs a user is likely to select are made based on the monitored selections/viewing, in Step 404.

In one example, a manifest of the predicted programs is prepared, in Step 406. The manifest in this example is sent to the local storage device, such as the LCDN 116 in FIG. 1A, in Step 408. It is noted that in another example, the manifest is not sent to the LCDN 116 or other local storage, as discussed below.

In this example, the local storage device requests the programs in the manifest from the respective content provider 1, 2, 3, in Step 410. The predicted programs on the manifest are then sent to the local storage device in the off peak time period in accordance with an embodiment of the invention, in Step 412. In this example, CDN cloud App 210 in FIG. 2A may send the requested programs to the local storage device, such as the LCDN 116 in FIG. 1A, via the Internet 104 and the router 105, during the off-peak time period.

In another example, the content provider 1, 2, 3 may initiate sending of the predicted programs during an off peak time period. In this example, the manifests are not sent to user's local storages, such as the LCDNs 106. Instead, the manifest continues to be stored in the manifest database 218 in FIG. 2A. During an off peak time period, each manifest is checked to identify predicted programs for respective users, in Step 407. Then the programs in the manifest are retrieved and the retrieved programs are sent to respective local storage for each participating user, in Step 412. The manifests may be checked by the CDN 210, which retrieves the predicted programs from the program database 212 and sends the retrieved programs to respective users, as described above, for example.

It is noted that since the predicted program(s) are sent during an off-peak time period, there is minimal cost to the system whether a user actually watches the program or not. Predictions do not, therefore, need to have a high probability of selection. A probability of at least about 5% may therefore be sufficient, for example. To ensure that the local storage device has sufficient storage to accommodate the future predicted programs provided by the content provider(s), such as the content provider 1, 2, 3 of FIG. 1A, programs stored in the local storage device may be purged if they are not selected after a predetermined period of time. For example, if a predicted program is not selected in a predetermined time period from between 1 to three weeks of being provided to the local storage device, it may be purged. In other examples, predicted programs may be purged after one, two, three, four, five or six days after being provided to the local storage device. In one example, the predetermined time period is any time period greater than one day. In another example, downloaded predicted programs are not purged until the storage is full or near full. When full or near full, the oldest program or programs stored in the local storage device may be purged when one or more new predicted program need to be downloaded, for example. In one example, as used herein, the term "full" means being full or near full. The term "near full" in this example is within about 95% of being full, in order to accommodate logs and updates, for example, as is known in the art, where the term "about" means plus or minus 10% of the 95%.

The prediction engine cloud App 216 may implement Group A/Group B experimentation for different users to optimize operation of the prediction algorithm(s) based on the hit rate of programs stored by respective LCDNs 106 that are selected by respective users for streaming during a time period. The prediction algorithms, such as the machine learning algorithms may be optimized by maximizing the hit rate, for example.

User Device

Figure 5:
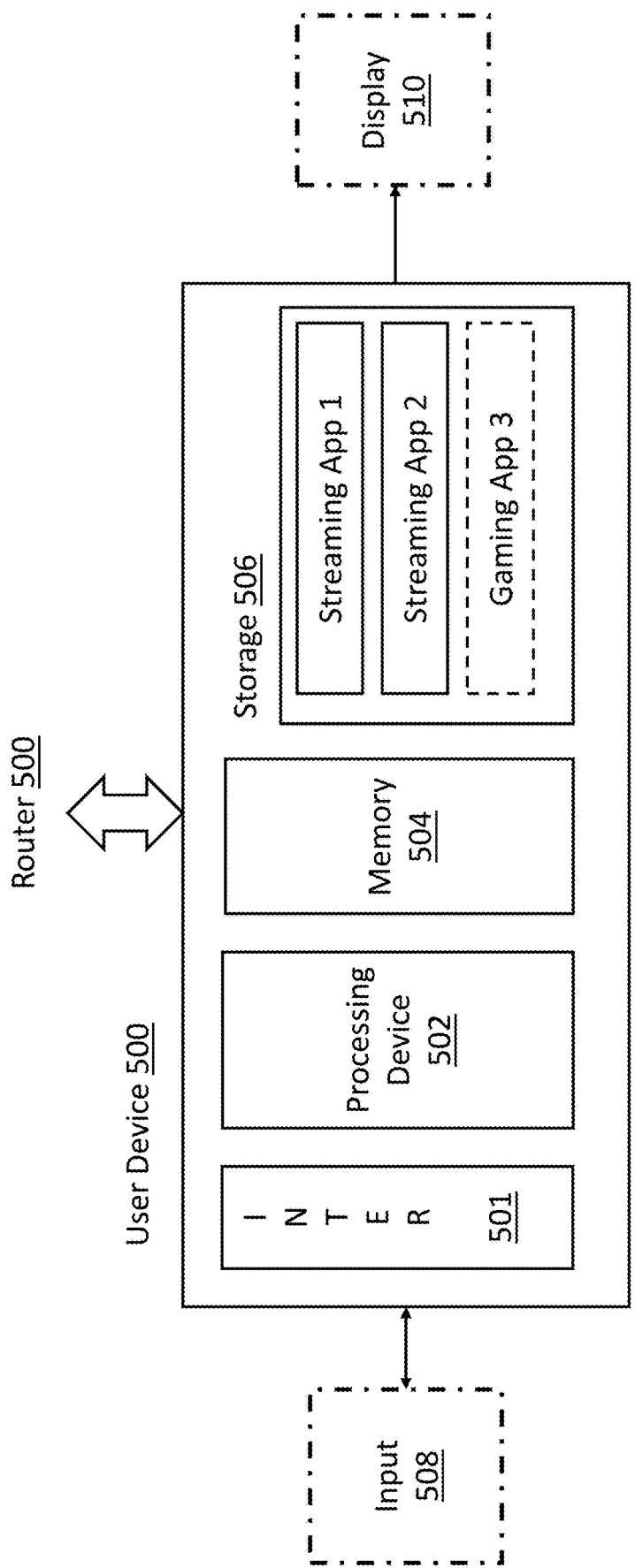
FIG. 5 is a block diagram of an example of components of a user device that are relevant to embodiments of the present invention.

FIG. 5 is a block diagram of an example of components of a user device 500 that are relevant to embodiments of the present invention. The user device 500 may be an IP STB box, a smart device, or a laptop computer, such as the IP STB 106, the smart device 112, the laptop computer 114, or the gaming console 115 of FIG. 1A, respectively, for example. The streaming device 500 may also be an Internet TV, for example. An Internet TV may include a Roku or Amazon Firestick (not shown) to enable Internet access, for example. While a game console, such as the game console 115 of FIG. 1A, typically does not stream software updates but instead receives complete software update files, the game console would have a similar structure as the user device 500 for the purpose of embodiments of the invention. Additional components of the user device 500 that are dependent on the type of streaming device are well known in the art and are also not shown or described to simplify FIG. 5. If the user device 500 is an IP STB box, a smart device, or a laptop computer, such as the IP STB 106, the smart device 112, or the laptop computer 114, for example, circuitry for receiving, decoding, and causing display of programs are well known in the art and are not shown in FIG. 5.

The user device 500 includes an interface 501 to provide two way communication with the router 500, a processing device 502, memory 504, and storage 506. The processing device 502 controls operation of the streaming device 500, under the control of software stored in the storage 506. The processing device 502 may be a central processing unit, a microprocessor, or a microcontroller, for example. The processing device 502 may also be a combination of hardware or software, or by hardware, such as an ASIC, for example.

The memory 502 may include one or more memory devices, such as random access memory ("RAM"), dynamic random access memory ("DRAM"), and/or read only memory ("ROM"), for example. The storage 504 may include one or more storage devices, such as one or more solid state storage devices ("SSD") and/or hard drives, for example.

The user device 500 further includes an input device 508, which is shown in broken line because there may be one or more integral and/or remote input devices, dependent on the type of streaming device. For example, in the case of the IP STB, integral input devices may be provided on the IP STB s, and a remote input device (such as the remote control 110 of FIG. 1A) may be used to provide input to the IP STB. A laptop computer may also have integral and remote input devices, such as a keyboard and remote mouse. A smart device may have a touch screen for input and a keyboard may optionally be coupled to certain smart devices, such as a tablet for example. A gaming console 115 may have a gaming remote control, for example.

Similarly, a display 510 is shown in broken line because the display could be remote, such as the TV 108 in FIG. 1A, or integral with a smart device 112 and laptop 114. A display 510 for a gaming console 115 may be remote or integral with the gaming console. It is noted that the TV 108 may be an Internet TV, which can also be a streaming device 108.

Software for controlling operation of the streaming device 500 may be stored in the storage 506, for example. A streaming App 1 and a streaming App 2 are also shown stored in the storage device 506. Respective streaming Apps are downloaded from respective content providers via the Internet. The streaming App 1 may be provided by Charter Communications (content provider 1) and the Streaming App 2 may be provided by Netflix (content provider 2), for example. More or fewer streaming Apps may be downloaded and stored in the storage device 508, depending on the choices and subscriptions made by respective users.

A gaming App 3 is also shown in dashed line stored in the storage device 506 in this example. The gaming application 3 is a software program provided by a gaming content provider to playing the online interactive video game on the gaming console. The gaming application 3 is shown in dashed line because if the user device is a streaming device, such as the IP STB 106, the smart device 112, or the laptop computer 114, then a gaming application 3 is not included. If the user device 500 is a gaming console 115, then the streaming App 1 and the streaming App 2 are not included.

Each respective streaming App is configured to display one or more graphical user interfaces ("GUIs") for authenticating a respective user, enabling selection of programs available for streaming when opened by a user, buffering programs streamed to the streaming device from a respect content provider, decrypting the buffered streaming programs (if encrypted), and cause display of the streaming program on the display 510 that is part of or associated with the respective streaming device 500, for example. As discussed herein, the streaming device 500 in this example may receive streaming programs from respective content providers 1, 2, 3, via the Internet 104 and the router 105 of FIG. 1A as well as from the local storage, such as the LCDN 116, via the router.

If the streaming device 500 is an IP STB 106 including a DVR, then the DVR may be the local storage device instead of the LCDN 116 of FIG. 1A, for example. In that case, the storage 506 would have the capacity to store the predicted programs, in addition to the programs that a user may record on the DVR.

Router

Figure 6:
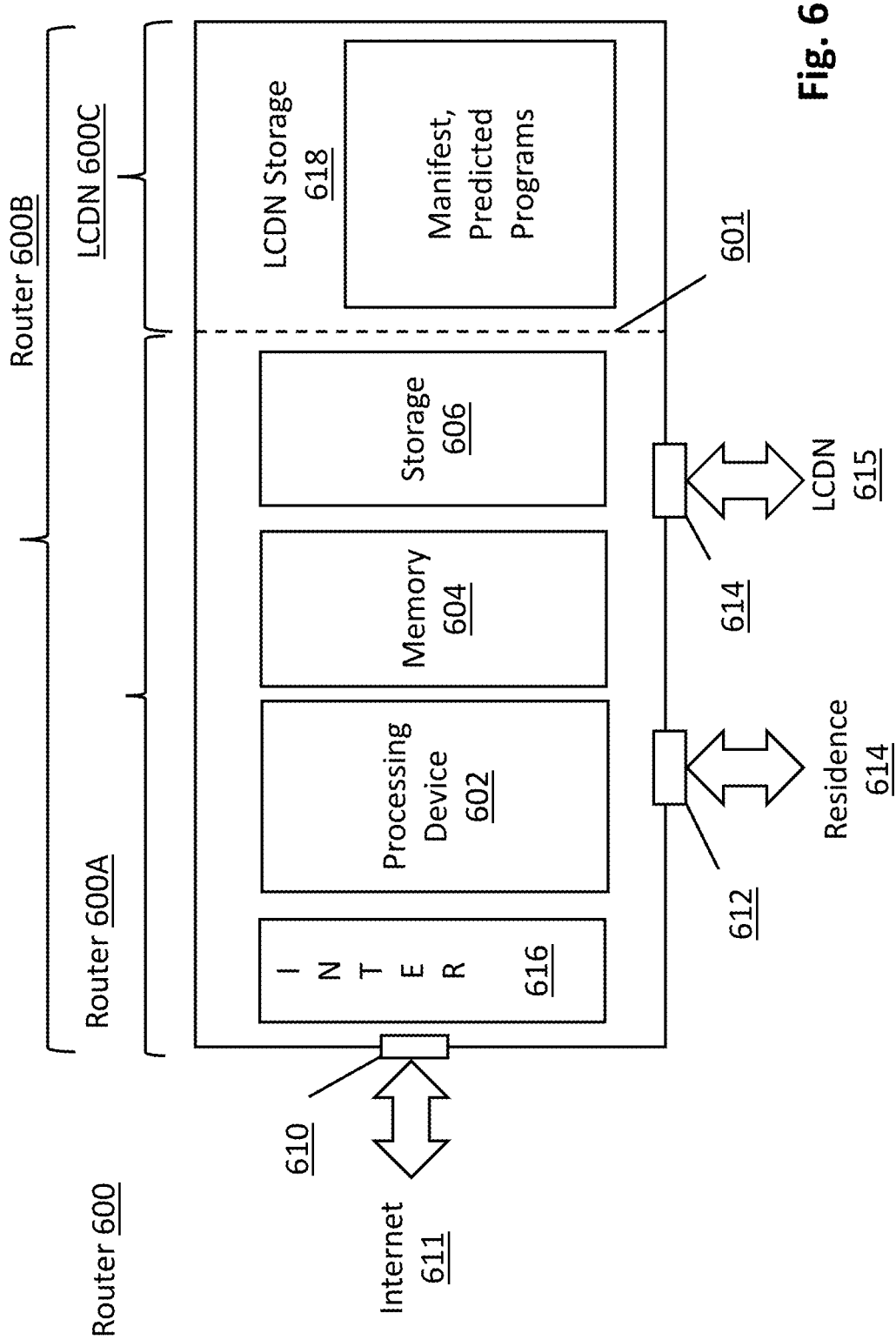
FIG. 6 is a block diagram of two examples 600A, 600B of certain components of a router in accordance with embodiments of the invention, which may be used in the system of FIG. 1.

FIG. 6 is a block diagram of two examples 600A, 600B of certain components of a router 600 in accordance with embodiments of the invention, which may be used in the CDS 100A of FIG. 1A, for example. A first router 600A, which is used when the local storage, such as the LCDN 116, is separate from the router, includes the components to the left of a dashed line 601. A second router 600B, which incorporates an LCDN 600C, includes the components to the left and to the right of the dashed line 601. In both examples, the router 600A and the router 600B may be a modified version of a conventional router, such as the router 105 discussed above. Other components of the router 600 necessary for the router to perform its functions are well known in the art.

The routers 600A and 600B include a processing device 602, memory 604, and storage 606. The router 600A, 600B may be a general purpose computing device, such as a computer or server, for example. The processing device 702 controls operation of the routers 600A, 600B, under the control of software stored in the storage 606, for example. The processing device 702 may also be controlled by a combination of hardware and software, or by hardware, such as in an ASIC, for example. The processing device 702 may be a central processing unit, a microprocessor, or a microcontroller, for example.

The memory 604 may include one or more memory devices, such as random access memory ("RAM"), dynamic random access memory ("DRAM"), and/or read only memory ("ROM"), for example. The storage 606 may include one or more storage devices, such as one or more solid state storage devices ("SSD") and/or hard drives, for example, for storing the operating system and other programs, if required. Software for controlling operation of the router 500 may be stored in the storage 606, for example. One or more ports 610 are provided for two-way communication with the Internet 611 and one or more ports 612 are provided for two-way communication with user devices in the local network in the home 613 or other residence. The router 600A also has one or more ports 614 for communicating with the separate local storage, such the LCDN 115 in FIG. 1A, if provided. An interface 616 provides two way communication with the Internet 611, the residence 614, and the LCDN 115 if separate from the router 600A. Multiple interfaces may be provided.

In one example, the software provided with a conventional router is modified as described herein to communicate with a separate local storage, such as the LCDN 116 in FIG. 1A. In particular, the software controlling operation of the router 600A may be modified to provide LCDN storage 618. In another example, new software may be prepared to control the router 600A.

In the example of the router 600B, which includes an LCDN 600C, storage, referred to as LCDN storage 618, is provided in the router to enable storage of predicted programs provided by respective content providers. The storage may be one or more solid state storage devices ("SSD") and/or hard drives, for example. The LCDN storage 618 may have a capacity to store 50 to 10 programs, for example. The storage capacity of the LCDN storage 618 may be at least 10 gigabytes, for example. In other examples, the storage capacity may be from one hundred gigabytes to one or more terabytes, such as three to five terabytes, for example.

Operation of the LCDN storage 618 may be controlled by the processing device 602 or a separate processing device (not shown) that communicates with the LCDN storage and the processing device 602 may be provided. The software controlling operation of the router 600B may be conventional software for controlling operation of a router, modified to enable storage of predicted programs in the LCDN storage 618 and to retrieve programs stored in the LCDN storage and provide selected programs from the LCDN storage to a requesting streaming device. In another example, the router 600 may be part of a smart TV or IP TV.

Standalone LCDN

Figure 7:
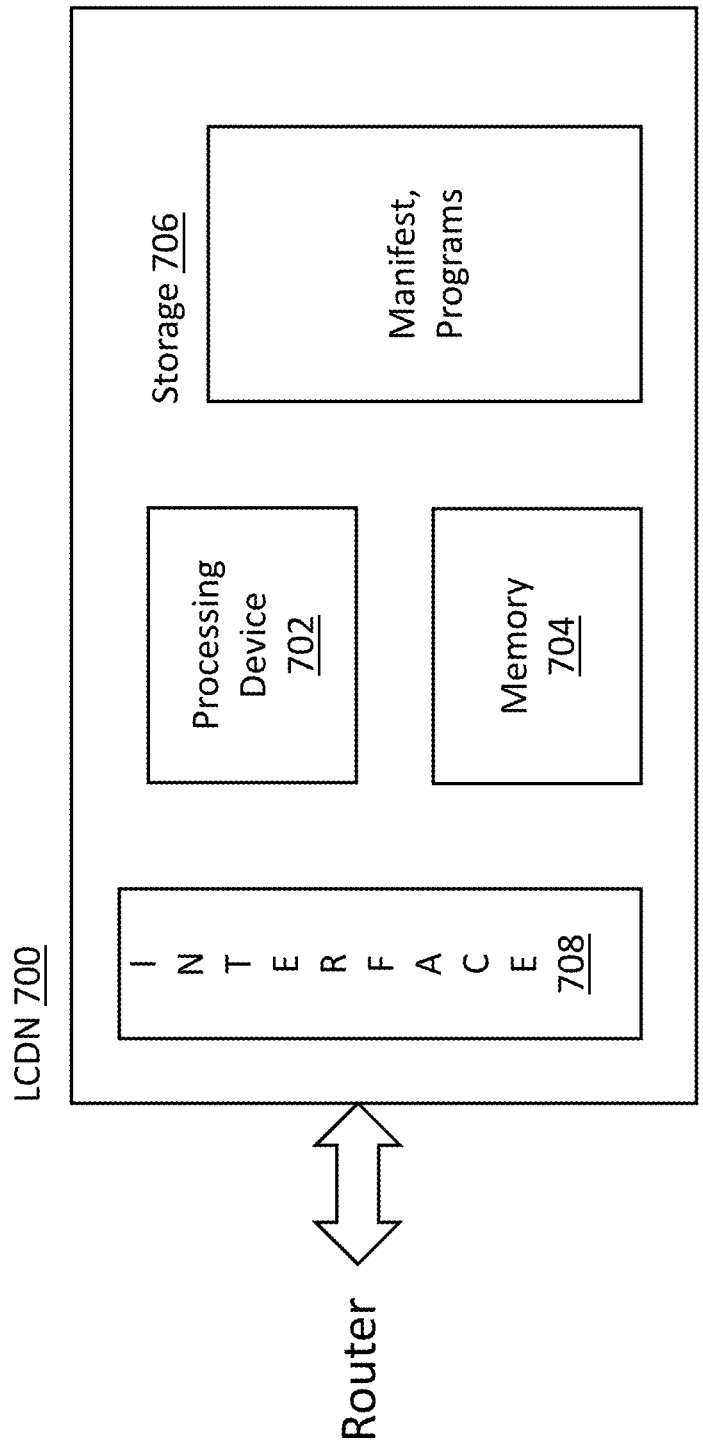
FIG. 7 is a block diagram of an example of components of an local storage device, when the local storage device is separate from the router, in accordance with an embodiment of the invention.

FIG. 7 is a block diagram of an example of components of an LCDN 700, such as the LCDN 116 of FIG. 1A, when the LCDN is separate from the router, in accordance with an embodiment of the invention. The LCDN 700 may be a general purpose computing device, such as a computer or server, for example. The LCDN 700 in this example includes a processing device 702, memory 704, and storage 706 for storing the manifest and predicted programs. The memory 704 may include one or more memory devices, such as random access memory ("RAM") and/or dynamic random access memory ("DRAM"), for example. The storage 706 may include one or more storage devices, such as one or more flash memory devices, solid state storage devices ("SSD"), and/or hard drives, for example.

The processing device 702 controls operation of the LCDN 700, under the control of software, a combination of hardware or software, or by hardware, such as an ASIC, for example. The processing device 702 may be a central processing unit, a microprocessor, or a microcontroller, for example. In one example, the processing device 702 may be an advanced reduced instruction set computer (RISC) central processing unit, such as an ARM central processing unit, for example, available from Arm Ltd., Cambridge, UK, and other vendors, as is known in the art. The processing device may also be a complex instruction set computer ("CISC") central processing unit, such as an x86-32 or x64 central processing units available from Intel Corporation, Santa Clara, California, and Advanced Micro Devices, Inc., Santa Clara, California, for example. The processing device 702 may run a Linux operating system or other operating systems, for example.

The storage 706 may include one or more SSDs and/or hard drives. The storage 706 has the capacity to store the software for controlling operation of the LCDN 700 as well as to store predicted programs provided by the content providers 1, 2, 3 in this example. As predicted programs are received, a table or database, also stored in the storage 706, may be populated by the URLs or other identifying information for the respective predicted programs and pointers to storage locations where the respective predicted programs are stored, for example. In one example, the table or database will be used to locate predicted programs in the storage 706. The storage 706 may have a capacity to store 50 to 100 programs, for example. The storage capacity of the LCDN storage 706 may be at least 10 gigabytes, for example. In other examples, the storage capacity may be from one hundred gigabytes to one or more terabytes, such as three to five terabytes, for example.

An interface 708 is provided to provide two-way communication with a router 710, such as the router 600A in FIG. 6 and the router 105 in FIG. 1A. The LCDN 700 may be connected to the router 710 via an Ethernet cable, or wireless WiFi 802.11 based technology for example.

Authentication

In accordance with an embodiment of the invention, two authentications of a user are provided by the authentication cloud App 222 of FIG. 2A. In a first authentication, the identity of the user is authenticated and in a second authentication, the authorization of the user to provide predicted programs to a local storage, such as the LCDN 700 of FIG. 7 or the LCDN 116 of FIG. 1A, for example, is authenticated.

FIG. 8A is a flow diagram 800A of an example of a first authentication process for authenticating the user. The authentication process is this example is a token based process, which are known in the art. Other authentication processes may be used. In the example of FIG. 8, a user 802, a user's streaming device 804 including a streaming App 806 for a respective content provider, a router 808, an LCDN 810, and an Authorization cloud App ("Auth") 812, which are described with respect to FIG. 2A, are involved in the authentication process.

A user 802 turns on their streaming device and selects a streaming App for the respective content provider in order to select, stream, and view a program provided by that content provider, in Step 816. The streaming device 804 may be the IP STB 106, the smart device 112, or the laptop computer 114 of FIG. 1A, for example. In one example, if the user 802 wants to watch a program provided by Netflix, the user turns on the Netflix streaming App. The streaming App 806 opens and displays a request for the user to login, in Step 817. The user 802 may login by entering their username and password, for example, in Step 818.

The streaming App 806 causes the streaming device 804 to send the login information provided by the user 802 to the Auth 812 with a request for a user token, in Step 820. The login information is provided to the Auth 812 in this example via the router 105 and the Internet 104 of FIG. 1A. The Auth 812 confirms that the username and password are valid for the user by comparison to information stored in a database (not shown), for example, in Step 821. The Auth 812 may also confirm the standing of the user, to ensure that the user is a current, paid up, and active subscriber, for example. The Auth 812 may confirm that the standing of the user by interaction with other cloud Apps, such as an account services cloud App (not shown), for example. After confirming that the requesting user 802 is entitled to proceed, the Auth 812 generates a user token, also in Step 821, and sends the user token to the streaming App 806 for storage on the streaming device 804, in Step 822. Token generation is known in the art. In one example, the token may be generated based on a hashed version of the username and password of the user, for example, as is known in the art. A cryptographic SALT value may also be included and hashed, as is known in the art for additional security. Open Authorization (OAuth), which is an open standard, may be used to generate the token, for example. The token may be stored in the storage 506 of the user device 500 of FIG. 5, in an encrypted format, for example. The user token may be sent to the streaming device 804 via the Internet 104 and the router 105.

The token indicates that the user 802 has been authenticated. A user token is typically reusable by the streaming App 806 for at least a predetermined period of time or number of openings of the streaming App to authenticate the streaming device 804 when the streaming App is opened, so that it is not necessary for the user to login again until the period of time expires or number of openings of the streaming App is met, as is known in the art.

If the user is not authenticated in Step 821, then a user token is not generated. A message may then be sent to the streaming device 804 by the Auth 812 instead of the user token, in Step 822, and a message displayed to the user via the streaming App 806 that the login was not successful or indicating another problem. The user 802 would then have the opportunity to login again, change their password, contact customer services, etc.

When the streaming device 804 receives the user token sent in Step 822, the streaming device determines whether an LCDN 810 is available by querying the router 808, in Step 824. If the LCDN 810 is part of the router 808, such as in the router 600B in FIG. 6, then the router is configured to directly return a confirmation that the LCDN is present, in Step 826. If the LCDN 810 is separate from the router 808, then the router 808 forwards the query to the LCDN 810, in Step 830. If the LCDN 810 is present and functioning, then the LCDN 810 sends a message confirming that the LCDN is available to the router 808, in Step 832. The router 808 sends a message that the LCDN 810 available to the streaming device 804, in Step 834.

Authentication continues in FIG. 8B, which is a flow diagram 800B of an example of a method for authorizing the LCDN 810 to receive manifests on the user's behalf. The same components of the system are used as in FIG. 8B as are used in FIG. 8A.

After receiving the message that the LCDN 810 is available in Step 834 of FIG. 8A, the streaming App 806 is configured to cause the streaming device 804 to prompt the user to allow use of the LCDN 810, in Step 840 of FIG. 8B. Express agreement by the user to use the LCDN 810 is requested in this example because in subsequent Steps the LCDN will request a manifest of recommended programs for a respective user that is prepared and stored by the content provider for the user based on user activity, raising privacy concerns. The streaming App 806 may cause the streaming device 804 to display a message on a display of the streaming device or on a display of a device associated with the streaming device 804 (such as on a TV 108 coupled to the IP STB 106 in FIG. 1A, for example), as discussed with respect to FIG. 5, for example, giving the option to the user to allow use of the LCDN 810 or not. The user may allow use of the LCDN 842 by selection of the proper option in the message, for example, using a touchscreen or input buttons on the streaming device, for example. The user's response to the prompt is received by the streaming App 806 in Step 842.

In response to receipt of the user's message allowing use of the LCDN 810, the streaming App 806 causes the streaming device 804 to send the previously received user token to the Auth 812 with a request for an application ("App") token from the Auth 812, in Step 844. The token may be sent in an encrypted format. The Auth 812 verifies the user token by decrypting the token and comparing the decrypted token to known good tokens that have been previously issued by the Auth 812, for example. If the user token is verified, the App token is generated, in Step 846. The token may be generated in a manner known in the art. In one example, the generated token is a globally unique identifier (GUID) or a hash of known attributes (such as the username and/or password of the user, for example) plus a cryptographic SALT value, making reconstruction nearly impossible, as is known in the art. The Auth 812 sends the generated App token to the streaming device 804 in response to the request, in Step 848.

After the streaming device 804 receives the App token, the streaming App 806 causes the streaming device to send the App token to the LCDN 810, in Step 850, which stores the App token in an encrypted format in the storage 706, for example, in Step 852. The LCDN 810 will use the App token to request the manifest of predicted programs from a respective content provider, in subsequent Steps. Possession of the App token indicates to the respective content provider in subsequent Steps that the user sending the App token has been authenticated by the content provider and has given permission for the manifest prepared by the content provider to be provided to the LCDN 810.

Obtaining Manifests and Programs

FIG. 9 is a flow diagram of an example of a process 900 for obtaining manifests of predicted programs by a local storage device, in accordance with an embodiment of the invention. It is noted that while programs are referred to here, the discussion is applicable to all digital content provided by the content providers 1, 2, 3, such as programs, advertising, and software updates. In the example of FIG. 9, an LCDN 902 initiates the process 900 during an off-peak time period. In other examples, the process may be initiated at any time because the manifests are small in size compared to programs and sending manifests across the network does not have a significant impact on network utilization. In this example, in a content provider 904, an Auth 906, a manifest web service 908, and a manifest database 910 are involved in the process 900.

In this example, at some time during the off-peak time period, such as at the beginning of the off-peak time period, the LCDN 902 retrieves the stored App token for a respective content provider acquired in the process 800B of FIG. 8B in Step 912 and stored in the storage 706, for example. In one example, each content provider sends manifests to their users over a period of time, such as over the course of an hour, for example, to the avoid a thundering herd problem. The manifests may be sent within the first hour of the off peak time period, for example. The LCDN 902 sends a request for the URL or other identifier of the user's manifest in the manifest database 910, with the App token, to the Auth 906, in Step 914. The LCDN 902 can determine that the off peak time period has begun based on a clock in the LCDN or the router 105 in FIG. 1A may instruct the LCDN that the off peak time period has begun based on a schedule defined by the streaming App provided by a respective content provider, for example. In one example, where the LCDN 700 is separate from the router, the processing device 702 of the LCDN 700 of FIG. 7 may retrieve the App token from the storage 706 in FIG. 7, generate the request including the App token, and send the request to the content provider 904 under the control of software stored in the storage 704, for example. The request may be sent via the router 105 and the Internet 104, for example, which are not shown to simplify the Figure. The router 600B of FIG. 6, which includes an LCDN storage 618, operates in a similar manner.

The Auth 906 receives the request and authenticates the App token. When the App token is authenticated, the Auth 906 requests the URL or other identifier for the manifest belonging to the user from the manifest database 910, based on the user token, in Step 916. The manifest database 910 identifies the URL or other identifier of the manifest for the respective user, based on the respective App token, and sends it to the Auth 906, in Step 918. The Auth 906 sends the URL/identifier to the requesting LCDN, in Step 920.

The LCDN 902 then generates a request for the manifest, including the URL or other identifier, and sends it to the manifest web service 908, in Step 922. The processor of the LCDN 902 may generate the request under the control of software stored in the storage 706 of FIG. 6, for example.

The manifest web service 908 reads data from the manifest database 910, in Step 924. The manifest database retrieves the manifest for the respective user based on the URL or other identifier and sends it to the manifest web service 908, in Step 926. The manifest web service 908 downloads the manifest to the LCDN 902, in Step 928, via the Internet 104 and the router 105 of FIG. 1A, for example. In another example, the manifest is not generated until the request for the manifest is received by the manifest web service 908 and passed on to the manifest database 910. In this case, when the request is received, the manifest web service 908 retrieves data features from the manifest database 910, which it uses to generate the manifest dynamically.

The LCDN 902 stores the manifest, in Step 929. The LCDN 902 may store the manifest in the storage 706 in FIG. 7, for example.

It is noted that instead of performing Steps 914-924 of the process 900, where the URL of the manifest is returned to the LCDN 902 and then the manifest is requested by the LCDN with the URL, the content provider may be configured so that the LCDN 902 makes a request for the manifest in Step 914 that includes the App token. When the Auth 906 authenticates the App token, the Auth 906 sends the request to the manifest database 910, which identifies the manifest associated with the user. The manifest is then sent to the LCDN 902, as described above.

The process 900 of FIG. 9 is repeated for each content provider for which an App token is stored by the LCDN 902. The process 900 may be performed serially for each content provider, for example.

Figure 10:
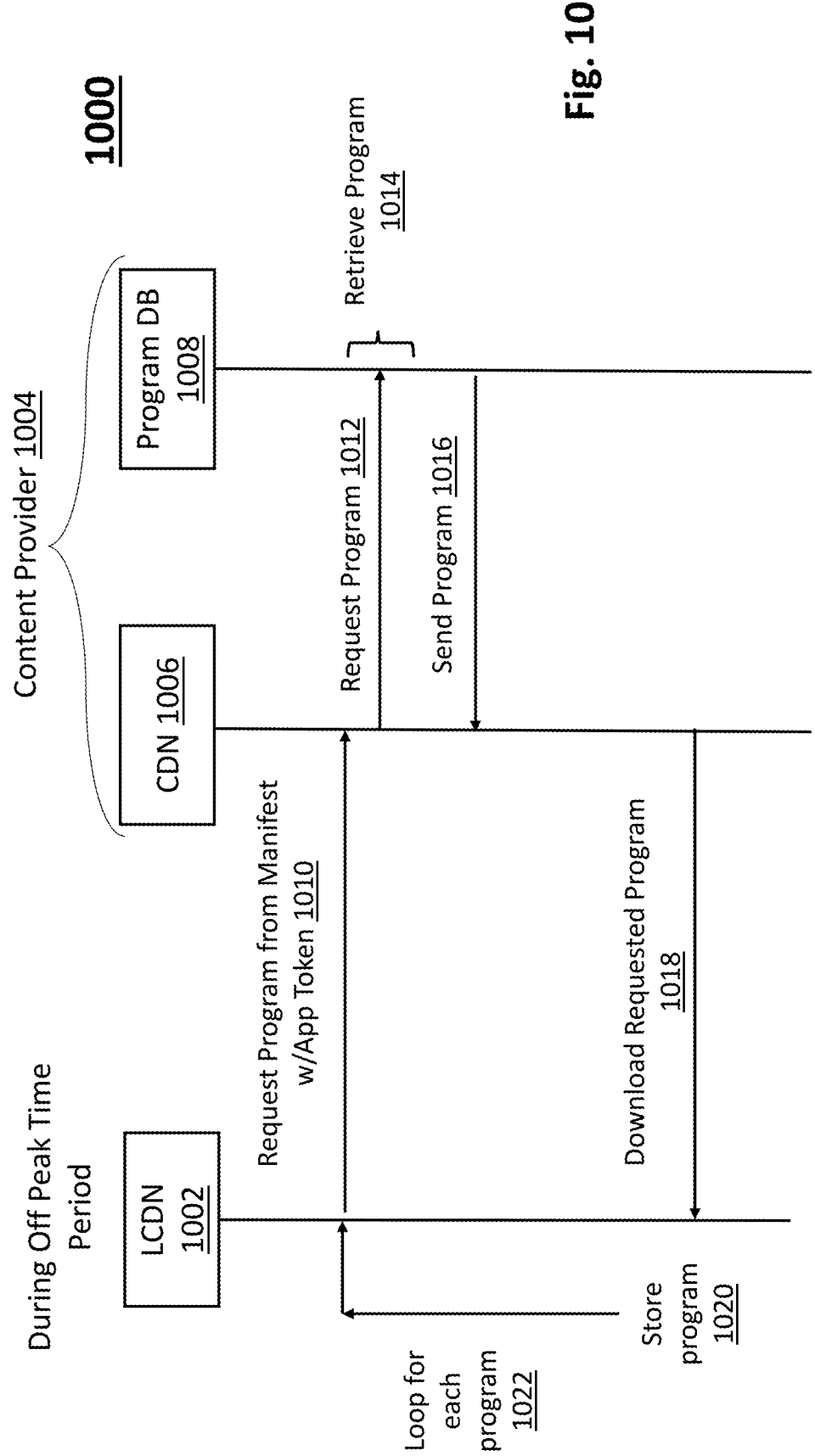
FIG. 10 is an example of a process for obtaining programs by a local storage device from a respective content provider, in accordance with an embodiment of the invention.

Now that the LCDN 902 has the manifest, the LCDN can request the programs in the manifest during the off peak time period, in accordance with an embodiment of the invention. FIG. 10 is an example of a process 1000 for obtaining programs by the LCDN 1002 from a respective content provider 1004, in accordance with an embodiment of the invention. The respective content provider 1004 is the content provider that authenticated the LCDN 1002 and provided the user token and the App token. The LCDN 1002, the CDN 1006, and the program database 1008 are involved in the process 1000.

In this example, the LCDN 1002 sends a request for a program from the manifest to the LCDN 1006 of the content provider who provided the manifest, with the App token, in Step 1010. The LCDN 1002 may request the program by selecting a URL for a predicted program from the manifest, such as the first URL, and sending the URL to the LCDN 1006 with the request. The request also includes an IP address of the LCDN 1006 of the respective content provider and a return IP address of the requesting LCDN 1002. The App token is authorized by the authorization cloud App of the content provider, such as the Auth 906 of FIG. 9, to confirm that the LCDN 1006 has been authorized by the user to receive manifests and programs, as in Step 914 of FIG. 9. These Steps are not shown in FIG. 10 to simplify the Figure.

If the authorization cloud App, such as the Auth 906 of FIG. 9, verifies the App token, then the CDN 1006 passes on the request, sending the URL or other identifier in the received request to the program database 1008 with a request to retrieve the program corresponding to the request, in Step 1012. The program database 1008 retrieves the program based on the URL, in Step 1014, and sends the program to the CDN 1006, in Step 1016. The CDN 1006 then downloads the program to the LCDN 1002, in Step 1018. The program may be downloaded to the LCDN 1002 via the Internet 104 and the router 105 in FIG. 1A, for example.

The LCDN 1002 receives the program and stores the program, in Step 1020. The program may be stored in the storage 706 in FIG. 7, for example. The LCDN 1002 then requests another program in the manifest, such as the next program in the manifest, in Step 1022. In this example, the process 1000 loops through Steps 1010-1022 until all the programs have been requested and downloaded from the manifest from a respective content provider. When there are multiple content providers, then programs may be requested by the LCDN 1002 and downloaded from the manifests received from each content provider serially or in a rotating manner, as described further below.

Managing Predicted Programs Stored in the LCDN

Returning to FIG. 6 and FIG. 7, since the storage space of the LCDN storage 618 in the LCDN 600C in FIG. 6 and the storage 706 in the LCDN 700 in FIG. 7 are finite, it may become necessary to delete predicted programs stored in the LCDN 600C, 700 to make available storage space for newly provided predicted programs. Similarly, it might be necessary to limit the number of new predicted programs provided by respective content providers 1, 2, 3. It is noted that while programs are referred to here, the discussion is applicable to all digital content stored in the LCDN 600C, 700, such as programs, advertising, and software updates, for example.

In one example, programs stored in the LCDN 600C, 700 may be deleted after being stored for a predetermined period of time without being selected by a user device. The predetermined time period may be any time period greater than one day (24 hours), for example. Examples of predetermined time periods may be in a range of from 24 hours to 3 or more weeks, for example. Predetermined time periods may be 2 days, 3 days, 5 days, 1 week, 2 weeks, or 3 weeks, for example. The time periods may be set by the LCDN 600C, 700, by a respective content provider, and/or by a user during a setup procedure, for example. The time periods may be associated with the programs and/or manifest as they are received, in a table or database, for example. Instead of a predetermined time period, predicted programs may also be assigned expiration dates beyond which the program is to be deleted by the LCDN 600C, 700. Different content providers, or the program sources who provide the programs to the content providers 1, 2, 3, may also establish different time periods or expiration dates contractually. Programs may also be deleted from the LCDN 116, 600C, 700, on a first-in, first-out ("FIFO") basis, for example, as new programs are provided to LCDN 116, 600C, 700 if the LCDN is full. In another example, downloaded predicted programs are not deleted until the storage is full or near full.

The predetermined time period may also vary or be varied based on the viewing habits of a respective user, based on respective programs, and/or based on respective content providers 1, 2, 3, for example. The predetermined time period may be determined using machine learning and taking into consideration a desired hit rate, for example. For example, analysis of the viewing habits of a respective user, such as the time period(s) during the day the respective user typically requests for streaming programs already stored in the LCDN 116, 600, 700, by the LCDN or by the prediction engine cloud App 216 of respective content providers 1, 2, 3 may reveal that a respective user watches one or more episodes of a respective program every Saturday night. In this case, the predetermined time period for the respective user may be set to 1 or two weeks, for example, in order to encompass a Saturday night. In another example, it might be found that a respective user streams one type of program, such as sitcoms, during the week, and another type of program, such as movies, on the weekend. Different predetermined time periods may then be set accordingly for the different types of programs. Viewing patterns may be similarly discovered for classes of users including all users or a subset of all users, for example. A collaborative filtering recommendation type machine learning technique, or other machine learning technique, may be implemented by the processing device 602 of the router 600B of FIG. 6, the processing device 702 of the LCDN 700 of FIG. 7, or the monitoring cloud App 212 and prediction engine cloud App 216 in FIG. 2A, for example.

Programs may be deleted at midnight or another time after the predetermined time period or expiration date is met or passed. If a program that is to be deleted is being streamed by a user, then in one example deletion is delayed until streaming of the program has been completed. If it is found that a user has streamed part but not all of a program and is not viewing the program at the deletion time, then deletion may be delayed in order to give the user time to complete the program. The deletion may be delayed for 1 or more days, for example, as determined by the content provider 1, 2, 3 providing the respective program, the user, or the LCDN 600C, 700, for example. The user may set the delay and other time periods during a set-up procedure, for example.

The predetermined time periods and/or expiration dates for respective programs may be stored in the LCDN 600C, 700 in association with respective programs, such as in a table or database, for example. Deletion dates may be calculated from the predetermined time period and the download date by the processing device 602 controlling operation of the LCDN 600C, or the processing device 702 of the LCDN 700 or another such processing device. It is noted that the expiration date may be independent of the download date. In either case, deletion dates associated with respective programs may be searched by the processing device 602 or the processing device 702 of the LCDN 700 or another such processing device, for example, and compared to the current date. When the current date matches the deletion date for a respective program, the program may be deleted. Since programs are provided in an off peak time period, in one example, the programs may be deleted at midnight of the deletion date, before the new predicted programs are provided.

The LCDN 600C, 700 may implement an algorithm to identify programs for deletion. In one example, programs are deleted as described in U.S. Pat. No. 9,681,164, which issued on Jun. 13, 2017, is assigned to the assignee of the present application, and is incorporated by reference herein. U.S. Pat. No. 9,681,164 describes methods and systems of managing stored program assets in a communications system by removing expired programs from storage based on expiration dates that are granted by a provider of the program content and associated with the respective programs in the storage. In embodiments of the present invention, expiration dates may be established by contractually granted rights by the content provider, the party providing programs to the content provider, or by the user, for example. It is further noted that the streaming App for a respective content provider also enforces content entitlements so that if a user is no longer eligible to stream a program, the streaming App, in conjunction with the content provider, will not allow the program to be streamed, even if the program still resides on the LCDN 600C, 700.

As discussed above, content providers 1, 2, 3 may also use machine learning to provide a strength of prediction weightings, also referred to herein as confidence scores, to predicted programs, which may be used to manage the programs stored in the LCDN 600C, LCDN 700. Confidence scores reflect the likelihood that a respective user will request a predicted program. Priority scores indicating the importance placed on the item by the content provider 1, 2, 3, may also be established by content providers and used to manage the programs stored in the LCDN 116, 600C, 700. For example, confidence may be used if a storage limit of an LCDN 600C, 700 is full (or near full, as discussed above), and it becomes necessary to delete programs on the LCDN to make room for new predicted programs. Programs with lower confidence and/or priority scores may be deleted to make room for new predicted programs before programs with confidence or priority scores are deleted. In one example, programs, or a listing of programs, may be ordered in the LCDN 600C, 700 from the lowest to the highest strength of prediction weighting, or vice a versa. When additional storage space is needed, one or more programs with the lowest confidence or priority scores may be deleted. This may be done on a program by program basis (as a new program comes in, a program with the lowest confidence or priority score is deleted) or by deleting groups of programs with the same low confidence or priority score, for example. Confidence and priority scores may be used in conjunction with how long a program has been stored in the LCDN 600*c*, 700 and/or the identity of the respective content provider 1, 2, 3 to determine which program to delete from the LCDN 600C, 700. Program deletion is discussed in more detail below.

In another example, programs may be deleted by the LCDN 116, 600C, 700 after being streamed by a user. In another example, a number of programs that may be stored from a respective content provider may be limited by: 1) the percent of time a user streams content directly from that respective content provider, and/or 2) by the percent of time a user streams programs provided to the LCDN 600C, 700 by that same content provider. If a user spends an equal amount of time watching streaming programs from each content provider 1, 2, 3, through direct streaming and/or from the LCDN 116, 600C, 700 in this example, then each content provider would be allocated an equal amount of available storage space regardless of how many predicted programs a respective content provider may try to provide during an off peak time period. If a user watches more streaming content directly from the content provider 1 and/or from the LCDN (provided by the content provider 1), for example, then a proportionally greater amount of storage space in the LCDN 116, 700, 600B may be allocated to the content provider 1 than is allocated to the content provider 2 and 3, for example. Limitations may be imposed by limiting the number of programs that may be listed on a manifest and/or the number of programs on the manifest that may be requested by an LCDN 116, 600C, 700, as discussed further below.

In another example, if a user's viewing history indicates that while predicted programs from a respective content provider are stored in the LCDN 116, 600C, 700, no programs from that content provider have been selected for streaming by the user in a predetermined period of time, such as 10 days, for example, all the predicted programs from that content provider may then be deleted at the end of that predetermined period of time.

Figure 11:
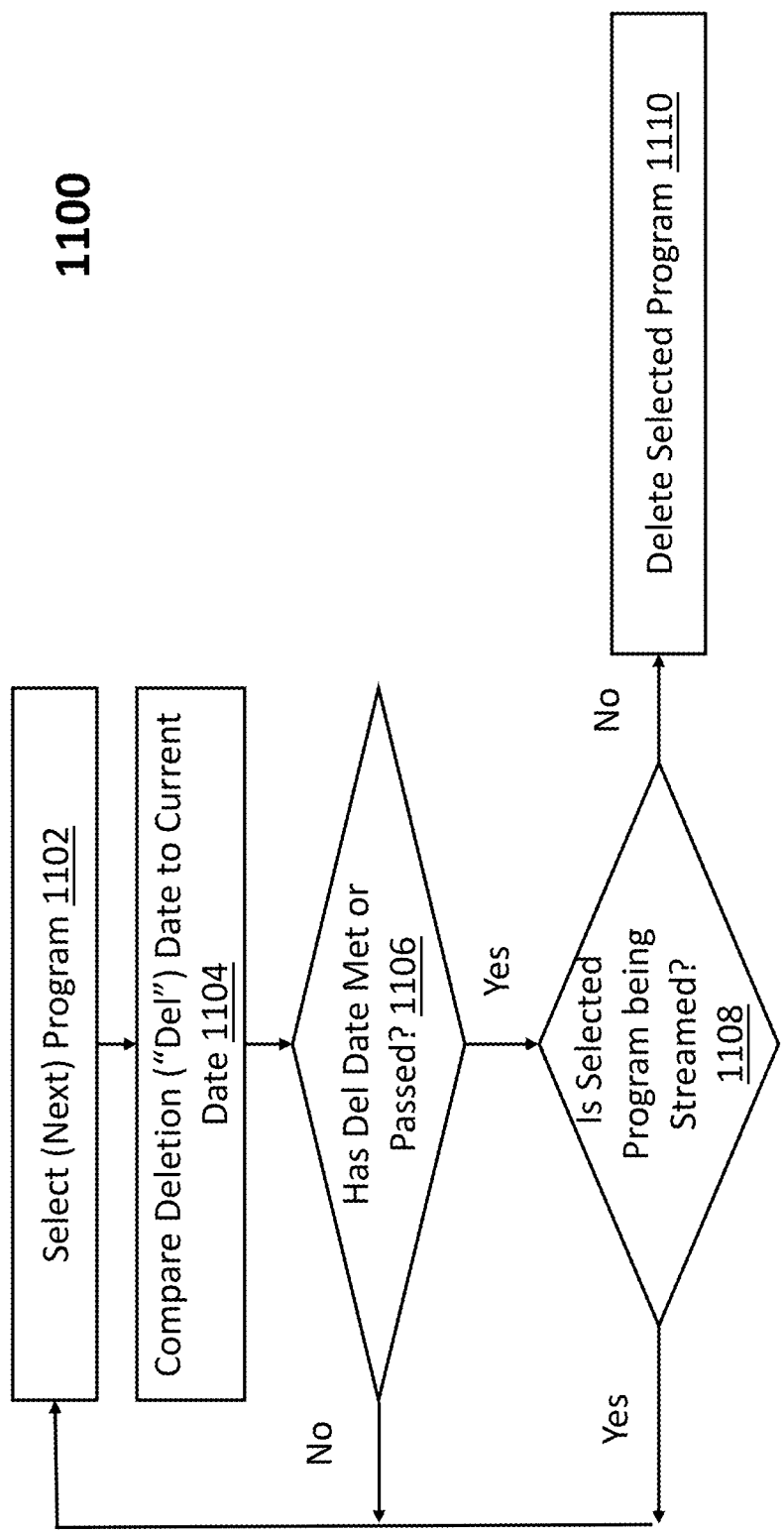
FIG. 11 is an example of a process for managing predicted programs stored in the local storage device, in accordance with an embodiment of the invention.

FIG. 11 is an example of a process 1100 for managing predicted programs stored in the LCDN 600C, 700, which may be implemented by the processing devices 602, 702, respectively, for example, in accordance with an embodiment of the invention. The process 1100 may be implemented before predicted programs are requested by the LCDN 600C, 700 in FIG. 10, for example. It may also be performed at other times. A program stored in the LCDN 1002 is selected, in Step 1102. In the process 1100, it is assumed that deletion dates for each program have been calculated based on the predetermined time period or based on the expiration date. The deletion date is stored in a table or database, For example. A deletion date of the program is identified in the table or database, for example, and compared to a current date, in Step 1104. It is determined whether the deletion date is the same as or after the current date, in Step 1106. If not (No in Step 1106), then the next program is selected in Step 1102, and the process is repeated.

If in Step 1106 the deletion date is met or passed (Yes in Step 1106), then it is determined whether the program is currently being streamed from the LCDN 600C, 700 to the user, in Step 1108. If not (No in Step 1108), the program is deleted, in Step 1110. The processing device 602 and the processing device 702 may be configured to determine whether a program selected for deletion is being streamed from the LCDN 116, 600C, 700, in a manner known in the art. If the program is being streamed (Yes in Step 1108), then streaming of the program is allowed to continue and the next program is selected, in Step 1102. The process is then repeated.

Figure 12:
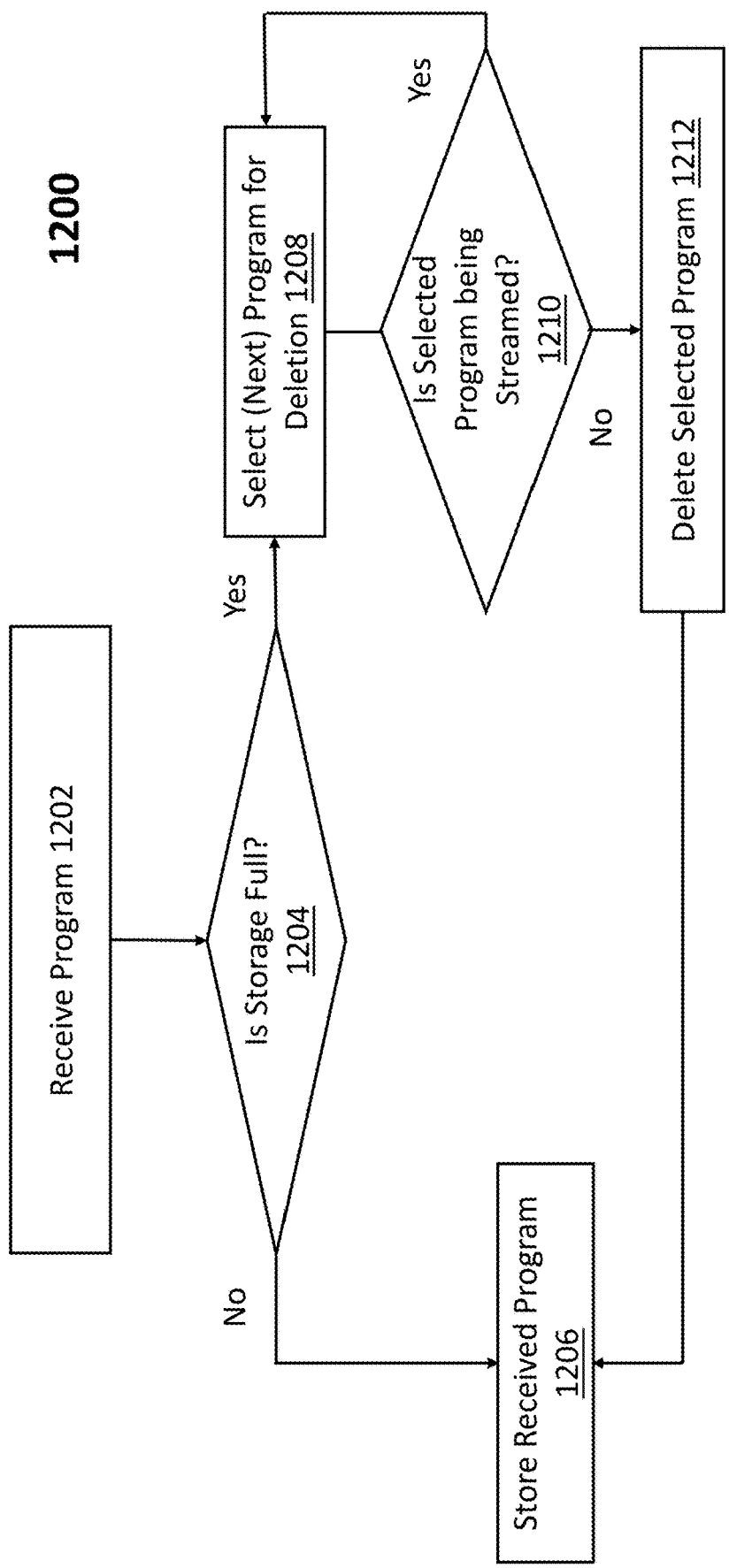
FIG. 12 is an example of another process for deleting programs in accordance with an embodiment of the invention.

If despite deleting programs based on the deletion dates before receiving new programs by the process of FIG. 11 or another such process, there is not enough storage space for the programs in the received manifests, then programs may be deleted as new programs are received. FIG. 12 is an example of another process 1200 for deleting programs in accordance with an embodiment of the invention, when the storage 618, 706 of the LCDN 116, 600C, 700, respectively, receives a program when it is full or near full. The process 1200 of FIG. 12 takes place as programs are received from a content provider in FIG. 10 during an off peak time period. The process 1200 may be implemented by the processing device 602, 702 of the LCDN 600C, 700, respectively, for example.

In another example, all programs in the LCDN 116, 600C, 700 may be deleted if they are not in the current manifest.

A program is received during an off peak time period, in Step 1202. It is determined whether the storage of the LCDN is full or near full, in Step 1104, in a manner known in the art. The processing device 602, 702 may monitor its operating system, which records the disk usage, to determine whether the storage is full or near full, for example. If the storage is not full (No in Step 1104), then the program is stored in the storage, in Step 1106.

If the storage is full (Yes in Step 1204), then one or more stored programs are selected for deletion from the storage to make room for the received program, in Step 1208. As discussed above, the program selected for deletion from the storage may be the oldest program in the storage, or the program with the lowest confidence and/or priority scores, for example. It is then determined whether the selected program is being streamed by the user, in Step 1210. If not (No in Step 1210), then the selected program is deleted in Step 1212 and the received program is stored in Step 1206. While not indicated in the process 1200, if deletion of the selected program does not free up enough storage space for the received program, then the process may return to Step 1208 to select another program to delete.

If a program selected for deletion is being streamed by the user in Step 1210, then the process 1200 returns to Step 1208 to select a next program for deletion. The processing device controlling operation of the LCDN 116, 600C, 700, such as the processing device 602, 702, may be configured to determine whether a program selected for deletion is being streamed, in a manner known in the art.

The process returns to Step 1208 to select the next program. It is then determined whether any of the users in the household are streaming the selected next program, in Step 1210. Step 1208 and Step 1210 are repeated until a program is selected for deletion that is not being streamed. If no users in the household are streaming the next program selected for deletion (No in Step 1210), then the program is deleted in Step 1212 and the program received in Step 1102 is stored in the storage, in Step 1106.

Program Streaming

Figure 13:
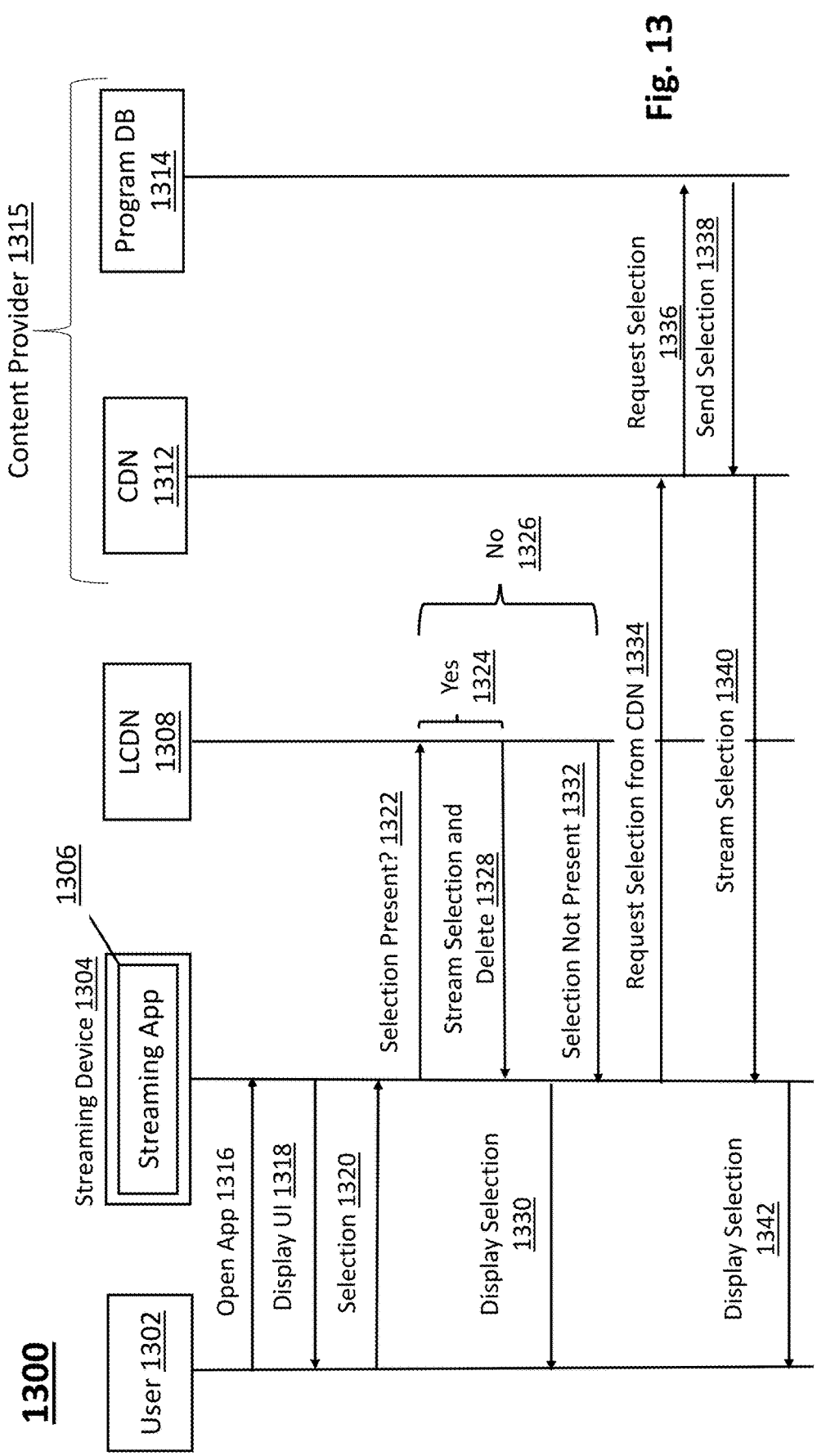
FIG. 13 is an example of a process for streaming selected program content from a local storage device or a content provider, to a user device, in accordance with an embodiment of the invention.

FIG. 13 is an example of a process 1300 for streaming selected program content from an LCDN 116, 600C, 700 or a content provider 1, 2, 3, in accordance with an embodiment of the invention. It is noted again that while programs are referred to here, the discussion is applicable to the download of all digital content stored in the LCDN 116, 600C, 700, such as programs, advertising, and software updates, for example. A user 1302, a streaming device 1304, a streaming App 1306 are shown. Also shown are a CDN 1312 and a program database 1314 of a content provider 1315.

A user 1302 opens the streaming App 1306 on the user device 1304, in Step 1316. Authentication, which is not shown to simplify FIG. 12, will be briefly described. If a user has been authenticated in the process 800 of FIG. 8A and has a user token, the user token is sent to the Auth 812 of the content provider for verification that the token is active. If the token is not verified, then the user 1302 is prompted by the streaming App 1306 to provide their login information in order to receive a token, as shown in and described with respect to FIG. 8A. After the token is verified or a new token is sent to the streaming App 1206, the streaming App is authorized to display a GUI to the user 1302 on a display associated with the streaming device 1204, in Step 1318.

The user 1302 selects a program to stream using a GUI on a display 510 of the user device 500 (in FIG. 5), in Step 1320. The streaming App 1306 receives the selection and sends a query to the LCDN 1308, asking whether the selected program is stored in the LCDN, in Step 1322. The processing device 502 of the streaming device 500 of FIG. 5 may generate the request under the control of the streaming App 1206, for example, and send the query to the LCDN 1308 via the router 105 in FIG. 1A, for example. In one example, programs displayed for selection on the UI are associated with respective URLs in the streaming device 1306. The URLs may be identified from a table or database correlating programs with URLs stored in the memory 504 or the storage 506 of the streaming device 500 of FIG. 5, for example, as is known in the art. The URLs may be the same as the URLs identifying the programs in the program database 212 of FIG. 2A, for example.

In other examples, instead of the URL, another identifier of the programs may be used.

The LCDN 1308 receives the query and searches for the selected program. The LCDN 1308 may search for the selected program by searching the table or database described above that contains URLs or other identifying information for respective predicted programs and pointers to the storage locations of the predicted programs, as discussed above. If the selection is found (Yes in Step 1324), then the selection is retrieved and streamed to the streaming device 1304, in Step 1228, via the router 105 in FIG. 1A or the routers 600A, 600B in FIG. 6, for example. The processing device 702 of the LCDN 700 of FIG. 7 may search for the selection in a table or database stored in the memory 704 or the storage 706 listing the URLs or other identifiers of predicted programs received from the content providers during the off peak time with pointers to the location of the stored predicted programs in the storage 706, for example.

After streaming, the program may be deleted, also in Step 1228. The LCDN 1308 may be configured to delete the program after the program has been completely streamed or after a threshold amount of the program has been streamed, such as the amount of the program up to the end of the program itself but not the end credits, for example. Alternatively, the program may be marked for deletion and then deleted at a later time during a housekeeping operation performed on the LCDN 1308. Housekeeping operations may be performed during an off peak time period, for example.

The streaming App 1306 causes display of the selection on a display device that is part of or associated with the streaming device 1204, in Step 1330. (See FIG. 5.)

As discussed above, the predicted programs provided to and stored by the LCDN 1308 may be encrypted. The streaming App 1306 for a respective content provider may be configured to decrypt programs encrypted by that content provider, in a manner known in the art. For example, the programs may be encrypted by the content provider with an asymmetric key that is provided to the streaming device 1304 for use by the streaming App 1306 to decrypt the program, for example.

If the selection is not found (No in Step 1326), then a message is sent to the streaming device 1204 stating that the selection is not present, in Step 1332. The message may be generated by the processing device 702 of the LCDN 700, under control of the program stored in the storage 706, for example.

When the streaming device 1304 receives the message in Step 1332, the streaming device, under the control of the streaming App 1306, generates a request for the selected program and sends it to the CDN 1312, in Step 1234. The CDN 1312 may correspond to the CDN cloud App 210 in FIG. 2A, for example. The request may be sent by the streaming device 1304 via the router 105 and the Internet 104 in FIG. 1A, for example. The request may include the URL or other identifying information of the selected program, as is known in the art.

The CDN 1312 receives the request from the streaming device 1304 and requests the selected program from the program database 1214, in Step 1336. The program database 1314 retrieves the selected program based on the URL or other identifying information in the request and sends it to the CDN 1312, in Step 1238. The CDN 1312 streams the selection to the streaming device 1304, in Step 1240. The CDN 1312 may stream the selected program to the streaming device 1304 via the Internet 104 and the router 105 in FIG. 1A, for example. In accordance with an adaptive bit streaming technique, such as dynamic adaptive streaming over HTTP ("DASH" or MPEG-DASH), for example, as is discussed above and is known in the art, the CDN 1312 may request segments of the program from the program database 1314 in Step 1336. The program database 1314 may retrieve the requested segments of the program serially and provide each segment to the CDN 1212, in Step 1338, and the CDN 1312 may then provide the segments serially to the streaming device 1306, in Step 1340. The streaming device 1304 generates confirmation messages to confirm that respective segments have been received, under the control of the streaming App 1306. The CDN 1312 continues to request segments from the program database 1314 as confirmation messages are received from the streaming device 1304 indicating that the program continues to be streamed. The passing of confirmation messages from the streaming device 1304 to the CDN 1312 and the multiple requests for segments by the CDN to the program database 1314 are not shown to simplify FIG. 12.

Advertising

As discussed above, programs may be streamed to user devices including advertising. Programs downloaded to an LCDN 116, 600C, 700, during an off peak time period, may, therefore, also include advertising. Advertising, such as local advertising, may also be streamed separately from a program, for insertion into a program by a user device. Such advertising may also be selected by content providers 1, 2, 3 and downloaded to the LCDN 116, 600C, 700 during an off peak time period, in accordance with an embodiment of the invention, as discussed above. As is known in the art, national advertising in a program may be replaced by local advertising by a user device. U.S. Pat. No. 8,312,504, which is assigned to the assignee of the present application and is incorporated by reference herein, describes the insertion of local advertising into a program by a terminal, such as a set-top box, based on segmentation messages included in a program. In U.S. Pat. No. 8,312,504, segmentation messages are inserted into the program and program stream by the source of program content.

National advertising provided with a program may be similarly replaced by local advertising based on segmentation messages or other such indicators in embodiments of the present invention. Content providers and program sources may insert segmentation messages or other types of messages into a program to indicate where advertising may be inserted. User devices, such as an IP set-top box 106, a smart device 112 and a laptop 114 in FIG. 1A may also insert and replace advertising based on the segmentation or other such messages, under the control of a streaming App provided by a respective content provider, for example. Originally live streamed programs acquired by on demand streaming content providers, such as Hulu, for example, may use the original segmentation or other such indicators to insert advertising under the control of their streaming App.

In the case of streaming advertising selected by a content provider 1, 2, 3 for download to an LCDN 116, 600C, 700 during an off peak time period, the user device 500 of FIG. 5, for example, may request the advertising for insertion from the LCDN when indicated by the segmentation message or other such indicator, instead of the user. The user device 500 may request the advertising under the control of the streaming App 1, 2, of the content provider 1, 2, 3 that provided the program being streamed. Advertising, such as local advertising, may be selected and downloaded to the LCDN 116, 600C, 700 by a content provider during an off peak time period based on contractual requirements of advertisers, demographics (where does the user live, for example) and/or other information the content provider has about the user. Particular advertising may also be selected for download to the LCDN 116, 600C, 700 during an off peak time period during promotional campaigns for upcoming programs or service options by a respective content provider 1, 2, 3, for example. Advertising selected by a content provider for download to the LCDN 116, 600C, 700 during an off peak time period may also be included on the manifest and be requested by the LCDN, as described herein.

It is noted that while an advertiser may require that an advertising that they purchase be played at a particular frequency during a day, in one example, it is only necessary to download the advertising to the LCDN 116, 600C, 700 once. The streaming App 1, 2 for a respective content provider may be informed by the respective content provider of the frequency the advertising needs to be played, when the advertising needs to be played, and any other requirements related to the advertising, and request the advertising from the LCDN 116, 600C, 700 when required.

In addition, a sponsor of advertising may purchase advertising time for the same commercial from different content providers 1, 2, 3. One or more content providers 1, 2, 3 may have agreements with each other and/or with advertising distributors to share advertising so that advertising downloaded by one content provider during an off peak time period to the LCDN 116, 600C, 700, such as the content provider 1, may be used in association with programs provided by another content provider, such as the content provider 2. Being "used in association with" means here that the advertising provided by the content provider 1, for example, is played before, during, or after a respective program provided by the content provider 2, for example.

Online Interactive Video Gaming Software Updates

The download of software updates for online video games during an off peak time period is discussed above. It may be advantageous to download other types of non-video digital content from content providers, such as other types of software updates. For example, it may be advantageous to download updates to operating systems, such as Windows and Apple OS updates during an off peak time period, for example.

In one example discussed above, one or more of the content providers in the CDS 100A, 100B may be a provider of an online interactive video game, for example, and one or more of the user devices may be a gaming console 115. In another example, where all of the one or more content providers 1, 2, 3 are respective providers of online interactive video games, an ISP is also provided.

Online interactive video game content providers have a typically closed "walled-garden" nature, where the content provider environment controls the user's access to network-based content and services, directing user navigation within particular areas on a website, for example. In such walled-garden environments, interactions with a content provider are not driven by users supplying their identities, such as a username and password, as described above, but rather by on-boarding content publishers, as is known in the art.

Game consoles 115 may have their own built-in updating functions that may operate in background operations. Game consoles 115 may also have requirements not shared by other user devices, such as that they must be powered on during software updates, updates cannot be cancelled by users, and updates are downloaded as a single file, for example.

A game content provider may operate in a similar manner as described above with respect to other content providers. Software updates from gaming content providers may be provided to a local storage device, such as an LCDN 116, 600C, 700, by gaming content providers during an off peak time period, as described herein. A gaming content provider "predicts" or selects a software update to identify for download to the LCDN 116 based on information about the user of the game console 115, such as which game or games have already been downloaded to the game console.

A game console 115 may request authentication from the gaming content provider in order to receive a system token authenticating the game console and an application token authorizing use of LCDN 116 in a similar manner as described above with respect to FIGS. 8A and 8B, except that the game console 115 is configured to request authentication and give authorization to use the LCDN 116, 600C, 700 without intervention of the user. Authentication may be provided by an authentication cloud App of the gaming content provider, such as the authentication cloud App 222 of FIG. 2A, for example.

The gaming content provider may prepare a manifest of one or more selected software updates for a gaming console 115, as described above. The manifest listing the one or more software updates may be sent to a LCDN 116, 600C, 700 from a gaming content provider, as shown as described with respect to FIG. 9. The LCDN 116, 600C, 700 may then request that a software update on the manifest be downloaded to the LCDN 116, 600C, 700, as described above with respect to FIG. 10, during an off peak time period. A software update may be integrated into a download plan, as discussed above with respect to FIG. 14. Since gaming and other software updates may be large, it may be advantageous to give game software updates priority in a download plan.

When a user selects a game on the game console 115 that requires a software update, the game console 115 is informed. The gaming console 115 may also be informed of a required update during periodic checks with the gaming provider during idle periods. If the gaming console 115 is informed that a software update is available, the game console sends a request for the software update to the LCDN 116, 600C, 700, as described above with respect to FIG. 13, for example. If the software update has been downloaded to the LCDN 116, 600C, 700, the LCDN downloads the software update to the game console 115, via the router. If the software update has not been downloaded to the LCDN 116, 600C, 700, then the game console 115 is informed and the game console requests the update from the game content provider, which downloads the software update to the game console via the Internet 104 and the router 105, is also described above with respect to FIG. 13 (see also FIG. 1A and FIG. 1B).

Where multiple residents of a building, such as an apartment building or other such shared residence, such as a university dormitory, for example, have their own game consoles 115 requiring the same update, it is currently necessary to download the update to each resident's gaming console. In accordance with an embodiment of the invention, a local storage device, such as an LCDN 116, is shared by some or all of the residents of a building, such as an apartment building or dormitory, for example, as shown in FIG. 1B, for example. Residents with gaming consoles 115 from the same content provider and requiring the same software update may then check the shared LCDN 116 for the software update. If the software update has already been downloaded to the LCDN 116, then each gaming console 115 may download the software update from the shared LCDN. As above, if a respective update is not stored on the LCDN 116, then the gaming consoles 115 can request the update from the gaming content provider.

In addition to the advantages of downloading digital content during an off peak time period instead of during a peak time period, discussed herein, providing software updates to a shared LCDN 116, 600C, 700 further decreases network utilization by decreasing the total number of downloads that need to be sent across the Internet. It is noted that this additional benefit provided by sharing a LCDN 116, 600C, 700 in a multi-unit residence 102B also applies to programs and advertising.

The local storage device, such as the LCDN 116 in FIG. 1A and FIG. 1B, for example, may be configured to operate without intervention of the user of the gaming console 115. The LCDN 116, 600C, 700 may also be configured to always be on so that it can receive the software updates at any time and be available to provide the software updates to the game console 115 at any time, when requested by the gaming console 115. The LCDN 116, 600C, 700 may also be configured so that software updates cannot be canceled by a user.

As is known in the art, gaming content providers may have different peak time periods that streaming content providers. This is due to the different demographics of typical gaming users, many of whom are teenagers. Gaming content providers may therefore have one or more different peak time periods than a streaming content provider. For example, gaming content providers may have a peak time period in the afternoon, after students return home from school, such as from about 2:30 PM to about 4:30 PM, for example. As discussed above, sending digital content during off peak time periods benefit the content providers, as well as the ISPs. A gaming content provider may, therefore, contract with an ISP to send gaming software updates during a time period that is an off peak time period of the gaming content provider, as well as the ISP.

Managing Content from Multiple Content Providers

Figure 14:
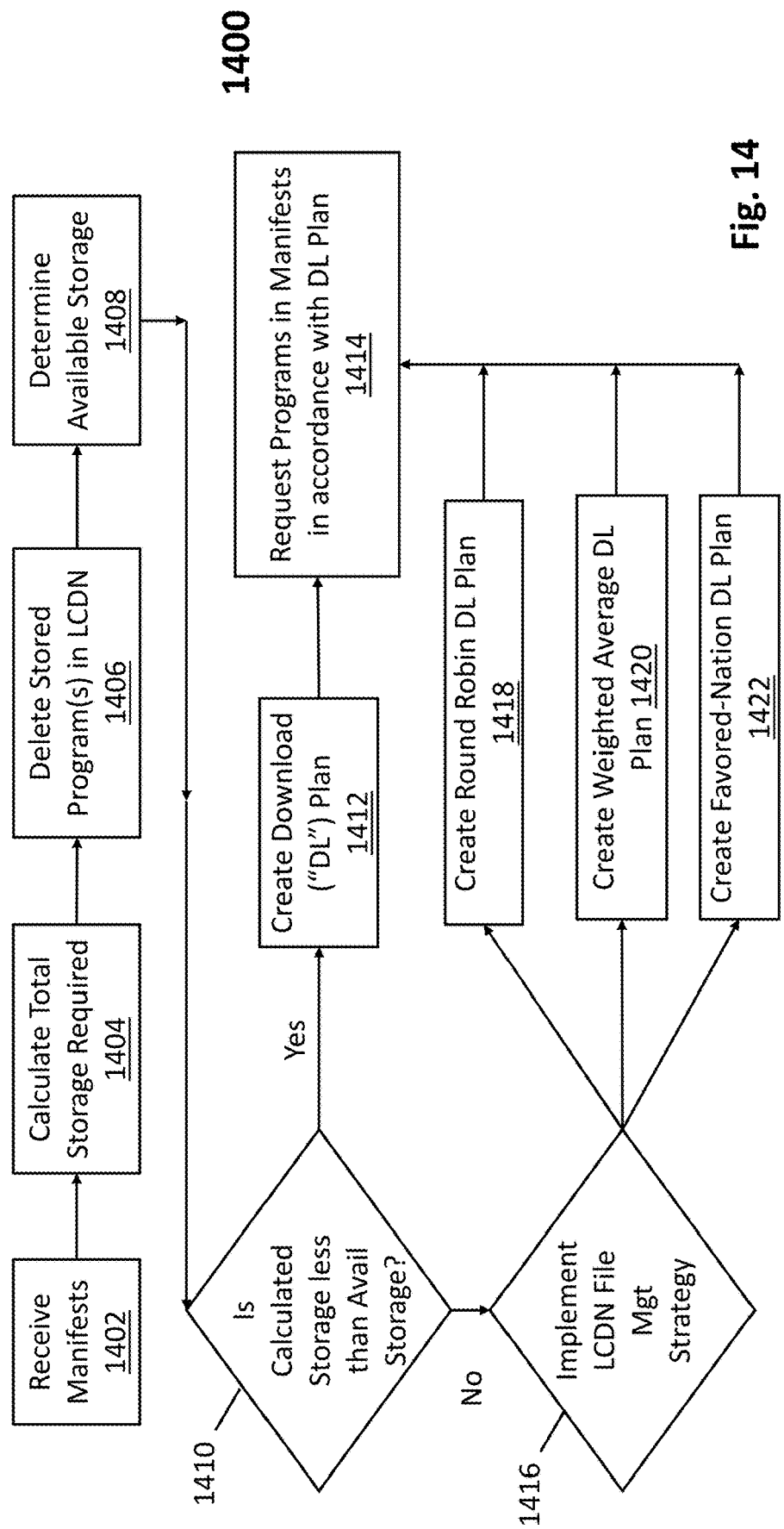
FIG. 14 is an example of a process implemented by a local storage device to manage the download of predicted programs from multiple content providers.

In accordance with an embodiment of the invention, storage space in the LCDN 116, 600, 700 is further managed to accommodate multiple content providers 1, 2, 3. Since the storage 608, 706 of the LCDN 116, 600, 700 is finite, one or more processes are implemented to free up storage space and allocate the available storage space among the multiple content providers 1, 2, 3. FIG. 14 is an example of a process 1400 implemented by the LCDN, such as the LCDN 116, 600C, 700, to manage the download of predicted programs from multiple content providers, such as the content providers 1, 2, 3 in FIG. 1A. The process is described with respect to the LCDNs 600C, 700 in FIG. 6 and FIG. 7, respectively, but is applicable to any local storage device in accordance with embodiments of the invention.

Manifests are received from each content provider 1, 2, 3 in Step 1402 on a respective day, as described herein. The manifests are analyzed, and the total storage required to store all the programs listed in each manifest is determined, in Step 1404. As discussed above, the manifests may include metadata, such the size of each listed predicted program in association with the identification of each program, for example. The indicated sizes for each listed program may be summed for each manifest and then the sum for each manifest may be summed to determine the total storage for all the received manifests that have been received that day, for example. The summing operation may be performed by the processing device 602, 702. The sum of the storage required for each respective manifest and the total storage required for all the manifests received that day may be stored in the memory 604 or the storage 618, the memory 704 or the storage 706 in FIG. 7, or other such memory or storage, for example.

Selected programs in the LCDN 600C, 700 are deleted, in Step 1406. The programs may be deleted based on a predetermined time period for storing programs and/or based on expiration dates of respective programs, as described above. The process of FIG. 11 may be implemented in Step 1406 to delete programs whose expiration date has passed (or have been in storage for more than the predetermined time period), for example. Step 1406 may be performed at any time before or after Step 1404, such as any time prior to receipt of the manifests in Step 1402 or prior to calculation of the available required storage in Step 1404, for example.

The storage available in the LCDN 600C, 700 is determined by the processing device 602, 702, in Step 1408, in a manner known in the art. For example, the available storage may be determined based on the total available storage space and knowledge of the size of each item of digital content downloaded to and deleted from the LCDN 600C, 700 by the processing device 602, 702, and/or by directly monitoring used and available storage space on the storage device through the file system.

It is then determined whether the storage calculated in Step 1404 is less than the available storage, in Step 1410. If the calculated storage is less than the available storage (Yes in Step 1410), then all the programs identified in each of the received manifests may be downloaded and stored in the storage 618, 706 of the LCDN 600C, 700. A download plan is created, in Step 1412. The download plan is a listing identifiers of the programs in each manifest received from each content provider 1, 2, 3, to identify the order in which programs will be requested by the LCDN 600C, 700 and downloaded from each content provider 1, 2, 3. The identifiers of the programs may be the URLs of the programs, as in the manifests provided by each content provider 1, 2, 3, or may be a listing of pointers to the programs in the different manifests, for example.

The download plan is created by the processing device 602, 702 of the LCDN 600C, 700. The download plan may be stored in the memory 604, 704 of the LCDN 600C, 700, for example. In one implementation, programs may be listed in the download plan in the order they appear in each manifest, where the programs in the manifest provided by the first content provider are listed first, followed by the programs listed in the second manifest provided by the second content provider, followed by the programs listed in the third manifest provided by the third content provider 3. The programs may follow the order that they appear in each manifest, for example. In another example, programs may be listed in a round robin fashion from each manifest, as described below with respect to Step 1418 of FIG. 14. Since there is enough storage space to receive all the programs, the actual download order does not matter.

The download plan may be retrieved from the memory by the processing device 604, 704 when programs are to be requested during the off peak time period. Programs are then downloaded in accordance with the download plan during an off peak time period, in Step 1214. The process 1000 is an example of a process for requesting programs from a respective content provider 1004 by the LCDN 1002 and downloading the requested program from the content provider is described with respect to FIG. 10.

If there is not enough storage space in the storage 618, 706 of the LCDN 600C, 700 to store all the programs in the received manifests (No in Step 1210), then all the programs listed in the manifests cannot be stored. It is therefore necessary to implement an LCDN management strategy, in Step 1416, to determine which programs from which manifest (from which content provider) to request. Three LCDN management strategy options are shown in FIG. 14: 1) creating a round robin download ("DL") plan in Step 1418, 2) creating a weighted average download plan in Step 1420, and 3) creating a favored nation download plan in Step 1422. The LCDN 116, 600C, 700 may implement one or more of the download plans.

Since there are three content providers 1, 2, 3 in this example, there are three manifests of predicted programs. In the round robin download ("DL") plan in Step 1418, a first program in a first manifest from the content provider 1 is listed in the downloaded plan, then the first program in a second manifest from the second content provider 2 is listed in the downloaded plan, and then a first program in a third manifest from the third content provider is listed in the download plan. Then the second program in the first manifest is listed in the downloaded plan, followed by the second program in the second manifest and then the second program in the third manifest. This is repeated in a serial, round robin fashion until the available storage space is used. If all the programs in one manifest are listed in the download plan before all the programs are listed from the other two manifests, in this example, then the remaining programs continue to be listed in a round robin fashion from the remaining two manifests. If all the programs from one of the remaining two manifests are downloaded, then the remaining programs on the remaining manifest are listed, until the total storage required to download all the programs in the download plan approaches or meets the available storage in the storage 602, 702 in the LCDN 600C, 700.

Since in this example, there is not enough storage space for all the programs in the manifests, it is possible that programs from one or two content providers in this example may download more program(s) than another. A first content provider that has an advantage on one day may be made the third content provider on another day to make the process more equitable. In another example, the designation of a content provider as the first, second, and third content provider for purposes of the round robin download plan may be randomly assigned daily or at another frequency, for example. After the download plan is completed, the programs in the download plan are requested by the LCDN 600C, 700 in accordance with the download plan, during an off peak time period, in Step 1414, as discussed above.

Instead of providing the programs in the round robin download plan in the order the programs appear in the manifests, as described above, confidence scores may be used to define the order programs are selected for placement in the round robin download plan. In this example above, the program in the first manifest from the content provider 1 having the highest confidence score is listed first in the downloaded plan, then the program in a second manifest from the second content provider 2 with the highest confidence score is listed in the downloaded plan, and then the program in a third manifest from the third content provider with the highest confidence score is listed in the download plan. Then the program in the first manifest with the next highest confidence score is listed in the downloaded plan, followed by the program in the second manifest with the next highest confidence score, and then the program in the third manifest with the next highest confidence score. This is repeated in a serial, round robin fashion until the available storage space is used.

To implement a round robin download plan based on confidence scores, the programs in each manifest may be ordered in a list from the highest confidence score to the lowest confidence score. Alternatively, each program may be associated with a confidence score in the manifest, which may be searched for the program with the highest and then next highest confidence score, etc.

Instead of or along with confidence scores, priority scores based on the importance of the program to the content provider 1, 2, 3 of respective programs may also be used to order predicted programs in the download plan. A program may have particular importance to a content provider for business reasons, such as being involved in a promotional campaign for new, existing, or seasonal program or series, for example. A content provider may also expect that a new program, for example, will be subject to a large number of streaming requests, but because it is new, it might not be predicted based on user activity. Priority scores may be used in the same manner as confidence scores to order programs on a manifest in the download plan in accordance with the proportionate share of a respective content provider 1, 2, 3.

Priority scores and confidence scores may be used together. For example, first, predicted programs with the highest priority scores from each content provider are place in the download plan in a round robin fashion, followed by predicted programs with high confidence scores, or vice a versa. Priority scores may be subject to contractual limitations with an Internet service provider ("ISP") (which can also be a content provider, such as Charter), for example. Contractual limitations may include the number of predicted programs with high priority scores in each manifest or over a period of time may be limited. A content provider may pay extra to use priority scores or more than a certain number of priority scores, for example.

In the weighted average download plan in Step 1420, remaining storage space in the LCDN 600C, 700 is allocated based on a hit rate for each content provider 1, 2, 3 over a period of time. Each content provider is assigned a proportion of the remaining storage space proportional to the hit rate. If the content provider 1 has a hit rate of 60%, the content provider 2 has a hit rate of 30%, and the content provider 3 has a hit rate of 10%, for example, then the content provider 1 will be assigned 60% of the remaining storage space, the content provider 2 will be assigned 30% of the remaining storage space, and the content provider 3 will be provided 10% of the remaining storage space.

The hit rate may be calculated by the processing device 602, 702 of the LCDN 600C, 700 by determining the rate of incidence of downloaded content being requested. Once the hit rates are calculated, the predicted programs from the manifest provided by each content provider may be added to the download plan until their proportionate share of the remaining storage is filled.

In one example, the programs may be added to the download plan in the order that the programs are listed on each manifest. The processing device 602, 702 may determine how many programs may be listed in the download plan from a respective manifest, taking into account the amount of storage space required by each program on the manifest. All the allowed programs may be listed in the download plan by the processing device 602, 702 from the manifest of the content provider with the highest proportionate share of programs, then all the allowed programs may be listed in the download plan from the manifest from the content provider with the second highest proportionate share of programs, and then all the allowed programs may be listed in the download plan from the content provider with the third highest proportionate share of programs, for example.

In another example, programs may be listed in the download plan from each manifest in a round robin fashion, as described above, until the allowed number of programs from each content provider have been listed in the download plan.

A content provider's proportionate share of the programs may also be added to the download plan in the order of their confidence or priority scores, as discussed above. The ordered programs may be listed from one content provider at a time or in a round robin fashion, as described above. In another example, confidence scores and/or priority scores may be used when there is a tie between two content providers for placement of a program from a respective manifest.

After the download plan is completed, the programs in the download plan are requested by the LCDN 600C, 700 in accordance with the download plan, in Step 1414, as described in FIG. 10, for example.

In the favored nation download plan in Step 1422, one or more of the content providers 1, 2, 3 may be given priority over the others in the download plan based on their status. For example, if the content provider 1 is also an ISP for the other content providers (such as Charter, for example), it may be agreed or required contractually that the content provider 1 has priority in the download plan. All or a particular percentage of the programs provided by the content provider 1 will then be listed in the download plan before programs provided by other content providers. In another example, one of the content providers could pay extra for priority placement of all or some of their predicted program content. The remaining content providers may have equal priority, so that an equal or approximately equal proportion of the storage remaining after allocation to the favored content provider(s). Contractual arrangements setting priority may be established on a long term basis and/or may be established for individual days or longer time periods, for example. Priority may also be acquired by a respective content provider for individual programs, seasons of programs, or entire series of programs, for example.

To implement the favored nation download plan, content provider priorities may be stored in a table or database in the storage 618, 706 by the processing device 602, 702 of the LCDN 600C, 700, for example. When a priority is updated, the table may be updated by the processing device 602, 702. The table may be checked before creating the download plan to identify any priorities that have been established.

Programs may also be listed in the download plan based on the priorities set by all the content providers 1, 2, 3. For example, if the highest confidence score in all the manifests is 90% for program 3 in the manifest provided by content provider 2, then program 3 will be listed first in the download plan and will be requested first. If the next highest confidence score in all the manifests is 85% for program 2 in the manifest provided by the content provider 3, then program 2 will be listed second in the download plan. Programs are added to the download plan based on their priority scores until the total storage required by the listed programs approaches or meets the available storage remaining in the LCDN 600C, 700. The processing device 604, 704 may compare the total storage required by all the programs listed in the download plan to the available storage after each program is added to the download plan, for example. After the download plan is completed, the programs in the program plan are requested by the LCDN 600C, 700 in accordance with the download plan, in Step 1414.

Each of the download plans 1418, 1420, 1422 may be implemented for a period of time and the best plan adopted by a respective LCDN 600C, 700, or for the CDS 100A, 100B as a whole. The "best" plan may be the plan with the highest hit rate, for example. The hit rates for each download plan 1418, 1420, 1422, or another download plan, over a period of time, may be collected from the streaming Apps of each content provider and/or the LCDN 600C, 700, for example, and analyzed by the Internet service provider (who may also be a content provider, such as the content provider 1 in FIG. 1A, for example) for selection of the best download plan to implement 1418, 1420, 1422. The "best" plan may be identified by an algorithm or by machine learning, for example. The best plan may vary based on the respective content providers 1, 2, 3, the number of content providers, or the geographic location of the CDS 100A, 100B, for example.

In another example, instead of the LCDN 600C, 700, the multi-service content provider 1, such as Charter Communications, for example, may generate and implement download plan as described above with respect to FIG. 14 by receiving manifests from the other content providers 2, 3 and monitoring the available storage space in the LCDN. The multi-service content provider 1 would then request download of items of digital content from itself and the other content providers 2, 3 to the LCDN 600C, 700 in the same manner that the LCDN requests the download of content in FIG. 14, in the off peak time period. The multi-service content provider 1 may monitor the available storage capacity of the LCDN 600C, 700 by receiving information concerning on the available storage from the LCDN and/or with information concerning size of the storage in the LCDN, the digital content downloaded, and the digital content deleted. If the CDN 100 includes an ISP instead of a multi-service content provider, the download plan may be generated by the ISP.

While embodiments of the invention are described with respect to an Internet based system content delivery system, as shown in FIG. 1A, it would be apparent to one of ordinary skill in the art that embodiments o the invention may also be implemented in other types of systems using other types of networks, such as conventional broadband communications networks that are available, including a fiber optic network, a telecommunications network, a cable television network and the like. The distribution network 140 may comprise one or more of an optical network, a hybrid fiber coax ("HFC") network for cable, an IP network, a Plain Old Telephone System (POTS) for ADSL, a terrestrial broadcast system like MMDS or LMDS, or a satellite distribution system like DBS, for example.

Examples of implementations of embodiments of the invention are described above. Modifications may be made to those examples without departing from the scope of the invention, which is defined by the claims, below.

What is claimed is:

1. A method of operating a local storage device in a broadband communication network including at least two sources of digital content, the local storage device being within a local area network of at least one user device, the method comprising:

receiving, by a user device, a respective first list of predicted items of digital content from the at least the two different digital content providers, the predicted items being selected by each respective digital content provider for download to the user device;

combining the respective first lists into a second list of predicted items based, at least in part, on available storage space of a local storage device of a respective user and on the digital content provider providing each first list;

receiving, by the local storage device, during an off peak time period of the broadband communications network, at least one item of digital content from each of the at least two digital content providers, in accordance with the combined second list, via the broadband communications network;
storing the received digital content in the local storage device; and
providing a selected one of the stored digital content from the local storage device to a user device in response to a request from the user device.

2. The method of claim 1, wherein the at least one item of digital content is selected by a respective content provider by predicting at least one item of digital content a user is likely to select for download based on the activity of the respective user.

3. The method of claim 1, wherein:
the second listing includes identifiers of selected items from the one or more first listings, the identifiers being in an order that the predicted digital content is to be requested from each respective digital content provider; and
requesting, by the local storage, the predicted digital content in the second listing from the at least two content providers, in the order of the second listing.

4. The method of claim 3, comprising creating the second listing by:
alternating the placement of identifiers of respective predicted digital content into the second listing from respective first listings until the available storage space is allocated;
placing the identifiers from respective first listings into the second listing based on a proportion of predicted digital content provided by a respective content provider that has been requested by the user device in a predetermined time period; and/or
prioritizing placement of identifiers from a respective first listing based on a status of the content provider providing the respective first listing.

5. The method of claim 1, further comprising:
deleting an item of predicted digital content from the local storage device, based, at least in part, on:
a length of time the item has been stored in the local storage device without being requested by a user;
a confidence score associated with the stored item; and/or
an expiration date of the item.

6. The method of claim 1, wherein, if the requested item of digital content is not stored in the local storage device, the method further comprises:
informing the user device that the requested item is not stored in the local storage device.

7. The method of claim 1, wherein the item of predicted digital content is a video program, an advertisement, or a software update.

8. The method of claim 1, wherein the at least one digital content provider includes an Internet service provider, a source of streaming content, a source of live streaming content and on demand streaming content, and/or a source of an online interactive game.

9. The method of claim 1, comprising:
receiving each item from the respective one of the at least two digital content providers by the local storage device, via a router; and
providing the item selected by a user device to the user device, from the local storage device, via the router.

10. An apparatus comprising:
a processing device; and
storage;
wherein the processing device is configured to:
receive respective first listings of items of predicted digital content a user device associated with the processing device is likely to request for download from a plurality of digital content providers, via a broadband communication network;
create a download plan by combining received first listings, the download plan including a second listing of items of predicted digital content from each of the first listings, the second listing being in an order that the predicted digital content is to be requested from respective content providers;
request items of predicted digital content from respective content providers in the order of the second listing;
receive the requested items of predicted digital content from the respective content providers during an off peak time period of the broadband communications network; and
store the received items of predicted program content in the storage.

11. The apparatus of claim 10, wherein the processing device is further configured to create the second listing based, at least in part, on available storage space in the local storage.

12. The apparatus of claim 11, wherein the processing device is further configured to:
alternate the placement of identifiers of respective predicted digital content into the second listing from respective first listings until the available storage space is allocated;
place the identifiers from respective first listings into the second listing based on a proportion of predicted digital content provided by a respective content provider that has been requested by the user's one or more streaming devices in a predetermined time period; and/or
prioritize placement of identifiers from a respective first listing based on a status of the content provider providing the respective first listing.

13. The apparatus of claim 10, wherein the processing device is further configured to:
delete an item from the local storage, based, at least in part, on:
a length of time the item has been stored in the storage without being selected for download;
a confidence score associated with the item; and/or
an expiration date of the item.

14. The apparatus of claim 10, wherein the predicted item of digital content is a video program, an advertisement, and/or a software update.

15. The apparatus of claim 10, configured to be coupled to a router for communication with the plurality of content providers, across the broadband communications network and for communication with the user device.

16. The apparatus of claim 10, wherein the processing device and the storage are part of a router.

17. A method of providing digital content to a user device by a content provider, via a broadband communication network having a first time period of network utilization and a second time period of network utilization less than the network utilization of the first time period, comprising:
predicting at least one item of digital content a user device is likely to request for download, by a processing device of the content provider;
preparing a listing containing the at least one predicted item, by the processing device;
receiving authorization from a user to provide the listing to a local storage device of the user;

sending the listing to the local storage device of the user, via a network, by the processing device;
receiving a request from the local storage device for a predicted item on the listing; and
downloading the requested item, via the broadband communication network, during the second period of the broadband communication network, for storage by the local storage device.

18. The method of claim 17, comprising downloading the at least one item during a portion of the second time period in which 20% or less of the network utilization of the broadband communication network is used.

19. The method of claim 17, comprising predicting the at least one item based, at least in part, on:
at least one prior item of digital content requested by a user device of the user;
at least one live streamed broadcast program on received by a user device;
a marketing program for an item of digital content;
a date or season of the year;
demographics of the user of the user device;
geographic location of the user;
at least one user preference;
popular items of digital content of the content provider; and/or
online interactive games downloaded by the user device.

20. The method of claim 19, comprising predicting the at least one item of digital content by machine learning.

21. The method of claim 17, comprising predicting, based, at least in part on user activity, at least one item of digital content comprising:
a single episode of a series of a video program;
all the episodes of a season of a video program; or
all of the episodes of all of the seasons of a video program.

22. The method of claim 17, comprising, when a user device requests an item of digital content from the local storage device that is not available on the local storage device, the method further comprises:
receiving a request for the item of digital content from the user device, via the broadband communication network;
retrieving the item of digital content from a storage storing available items; and
downloading the requested item of digital content to the user device by the processing device, via the broadband communication network.

23. The method of claim 17, wherein downloading the item comprises streaming the item to the user device; streaming advertising to the user device; or downloading a software update to the user device.

24. The method of claim 17, further comprising, prior to downloading the at least one predicted item of digital content to the local storage device:
receiving a request from the local storage device for an application token, if the user of the user device authorized the content provider to send predicted items of digital content to the local storage device, via the broadband communication network.

25. The method of claim 24, further comprising:
sending the application token to the user device, via the broadband communication network, wherein the user device sends the received application token to the local storage device; and
receiving the application token from the local storage device;
authenticating the application token; and
if the application token is authenticated, sending the listing to the local storage device, via the broadband communication network.

26. The method of claim 25, wherein:
receiving the request for the listing comprises receiving a request for an identifier of the listing;
the method further comprising:
sending the identifier to the local storage device, via the broadband communication network, if the application token is authenticated;
sending the identifier with the request for the listing from the local storage device;
retrieving the listing based on the identifier; and
sending the listing to the local storage device, via the broadband communication network.

27. A system for downloading digital content to user devices, via the Internet, comprising:
a first content provider configured to provide digital content to user devices, across the Internet;
an Internet service provider, wherein the first content provider provides digital content to user devices via the Internet service provider;
a local storage device at a user's residence; and
a router at a user's residence, the router configured to provide communication between a user device at the user's residence and the Internet, communication between the local storage device and the Internet, and communication between a user device at the user's residence and the local storage device;
the first content provider being configured to:
predict at least one item of digital content likely to be requested by a respective user device; and
provide the at least one item of predicted digital content to the local storage device via the Internet and the router, for storage, during an off peak time period of the Internet service provider;
the router being configured to direct a request for an item of digital content from a user device to the first content provider, to the local storage device; and
the local storage device being configured to:
receive authorization from a user of the user device to use the local storage device;
receive predicted digital content from a plurality of content providers, including the first content provider, via the Internet service provider and the router; and
provide the received item of digital content to the user device in response to the directed request.

28. The system of claim 27, wherein the first content provider and the Internet service provider are the same.

29. The system of claim 23, wherein:
the user device is configured to:
request a respective advertising stored in the local storage device for insertion into a digital item being displayed by the user device.

30. The method of claim 3, comprising creating the second listing based on confidence scores and/or priority scores assigned by respective content providers.

31. The system of claim 17, wherein:
the downloaded item is available to a user device of the user on request of the user device.

32. The apparatus claim 10, wherein the processing device is further configured to:
receive a request from the associated user device for an item of predicted digital content; and when the requested item is stored in the storage, providing the requested item to the user device in response to the request.

* * * * *